United States Patent
Jha et al.

(10) Patent No.: US 10,113,521 B2
(45) Date of Patent: Oct. 30, 2018

(54) AIR INTAKE SYSTEM FOR INTERNAL COMBUSTION ENGINE

(71) Applicant: CUMMINS INC., Columbus, IN (US)

(72) Inventors: Pallav Jha, Columbus, IN (US); Axel Zur Loye, Columbus, IN (US); Joseph Scot Roederer, Columbus, IN (US); Steven L. Leffler, Vincennes, IN (US); John A. Rennekamp, Seymour, IN (US); Amit A. Kulkarni, Columbus, IN (US); Peter Vinson Woon, Columbus, IN (US); Andrew Guy Kitchen, Daventry (GB)

(73) Assignee: CUMMINS INC., Columbus, IN (US)

( * ) Notice: Subject to any disclaimer, the term of this patent is extended or adjusted under 35 U.S.C. 154(b) by 0 days.

(21) Appl. No.: 15/429,105

(22) Filed: Feb. 9, 2017

(65) Prior Publication Data

US 2017/0152820 A1 Jun. 1, 2017

Related U.S. Application Data

(60) Continuation-in-part of application No. 14/489,584, filed on Sep. 18, 2014, now Pat. No. 9,605,630, which
(Continued)

(51) Int. Cl.
*F02M 35/10* (2006.01)
*F02M 35/116* (2006.01)
(Continued)

(52) U.S. Cl.
CPC ...... *F02M 35/116* (2013.01); *F02M 35/1045* (2013.01); *F02M 35/10111* (2013.01);
(Continued)

(58) Field of Classification Search
CPC ........ Y02T 10/146; F02B 75/22; F02B 31/04; F02M 35/112; F02M 35/10072;
(Continued)

(56) References Cited

U.S. PATENT DOCUMENTS 2,423,602 A 7/1947 Magdeburger
3,861,376 A * 1/1975 Ashley .................... F02B 23/00
123/188.14
(Continued)

FOREIGN PATENT DOCUMENTS

CN 101074639 11/2007
DE 195 17 079 11/1996
(Continued)

OTHER PUBLICATIONS

Chinese Office Action dated May 25, 2017 in corresponding Chinese Application No. 201480011353.X (English language translation).
(Continued)

*Primary Examiner* — Syed O Hasan
(74) *Attorney, Agent, or Firm* — Faegre Baker Daniels LLP

(57) ABSTRACT

An intake manifold is provided that controls swirl on entry to a combustion chamber. Each intake manifold includes a fin or rib portion positioned to reduce or eliminate swirl induced by the configuration of the intake manifold, particularly when used in a large engine having a left bank and a right bank of combustion chambers. By controlling swirl induced by the intake manifold, charge motion consistency is improved between engine cylinders and between the left bank and the right bank, thereby improving the consistency of combustion and power output, improving efficiency and reducing emissions (e.g., decreased particulate emissions (also described as smoke), hydrocarbon emissions, and NOx
(Continued)

emissions), and further including an improved knock margin, improved fuel economy, wider rich and lean limits, etc.

17 Claims, 14 Drawing Sheets

Related U.S. Application Data is a division of application No. 13/782,997, filed on Mar. 1, 2013, now Pat. No. 8,844,492.

(51) Int. Cl.
*F02M 35/104* (2006.01)
*F02F 1/42* (2006.01)
*F02B 75/02* (2006.01)
*F02B 31/04* (2006.01)

(52) U.S. Cl.
CPC .............. *F02B 31/04* (2013.01); *F02B 75/02* (2013.01); *F02F 1/4242* (2013.01); *F02M 35/1034* (2013.01); *F02M 35/10262* (2013.01)

(58) Field of Classification Search
CPC ....... F02M 35/10354; F02M 35/10118; F02M 35/10262; F02M 29/06; F23R 3/14; F23R 35/116
USPC .......... 123/184.21, 184.31–184.46, 306, 556
See application file for complete search history.

(56) References Cited

U.S. PATENT DOCUMENTS

| | | | | |
|---|---|---|---|---|
| 4,389,988 | A | | 6/1983 | Ong |
| 4,553,507 | A | | 11/1985 | Shaffer |
| 4,766,866 | A | | 8/1988 | Takii et al. |
| 5,632,145 | A | | 5/1997 | Hunt |
| 5,685,281 | A | | 11/1997 | Li |
| 5,924,398 | A | | 7/1999 | Choi |
| 5,970,963 | A | * | 10/1999 | Nakase .............. F02M 35/1211 123/184.21 |
| 6,173,695 | B1 | | 1/2001 | Davis et al. |
| 7,556,031 | B2 | | 7/2009 | Russell |
| 8,607,756 | B1 | * | 12/2013 | Kulkarni .......... F02M 35/10262 123/184.21 |
| 8,844,492 | B2 | | 9/2014 | Free et al. |
| 2002/0190480 | A1 | | 12/2002 | Gregoire |
| 2003/0168033 | A1 | | 9/2003 | Hunt et al. |
| 2004/0221830 | A1 | | 11/2004 | Kuehner et al. |
| 2006/0048738 | A1 | | 3/2006 | Isaji et al. |
| 2007/0261680 | A1 | * | 11/2007 | Farell ..................... F02M 31/13 123/556 |
| 2008/0041352 | A1 | | 2/2008 | Bolanos |
| 2009/0272356 | A1 | | 11/2009 | Abe et al. |
| 2010/0300392 | A1 | | 12/2010 | Cheung et al. |
| 2011/0232604 | A1 | | 9/2011 | Russell |
| 2013/0228146 | A1 | * | 9/2013 | Emler ..................... F02M 35/10 123/184.21 |
| 2014/0245983 | A1 | | 9/2014 | Free |

FOREIGN PATENT DOCUMENTS

| | | |
|---|---|---|
| DE | 10 2006 025889 | 12/2007 |
| DE | 102016004600 | 12/2016 |
| WO | 1985/01778 | 4/1985 |
| WO | 2007/030933 | 3/2007 |

OTHER PUBLICATIONS

European Office Action dated Jul. 10, 2017 in corresponding EP Application No. 14 756 503.0.
Supplemental European Search Report dated Jul. 4, 2016 in EP application No. 14756503.0.
International Search Report dated Jun. 20, 2014 in corresponding International Application PCT/US2014/019383.
H. Soltanipour et al., "Numerical Analysis of Heat Transfer Enhancement with the Use of y-AL2O3/Water Nanofluid and Longitudinal Ribs in a Curved Duct", Thermal Science, 2012, vol. 16, No. 2, pp. 469-480.
S.K. Rout et al., "Numerical Analysis of Mixed Convection through an Internally Finned Tube", Advances in Mechanical Engineering, vol. 2012, Article ID 918342, 10 pages.
Partial European Search Report dated Apr. 16, 2018 and dated Jul. 2, 2018 in corresponding EP Application No. 18 15 5557.

* cited by examiner

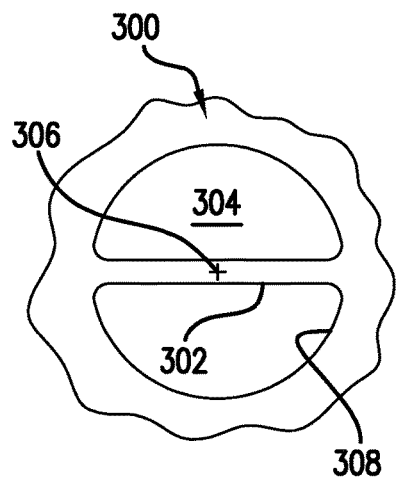
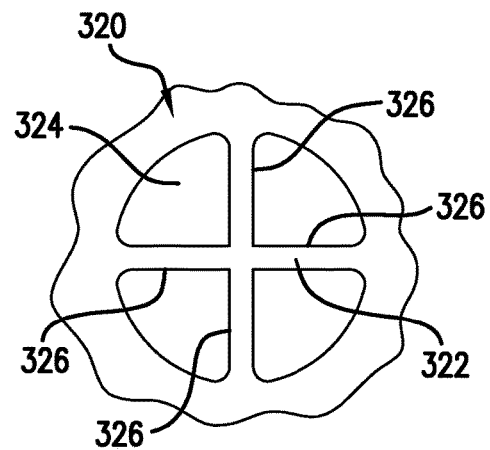
FIG.15      FIG.16
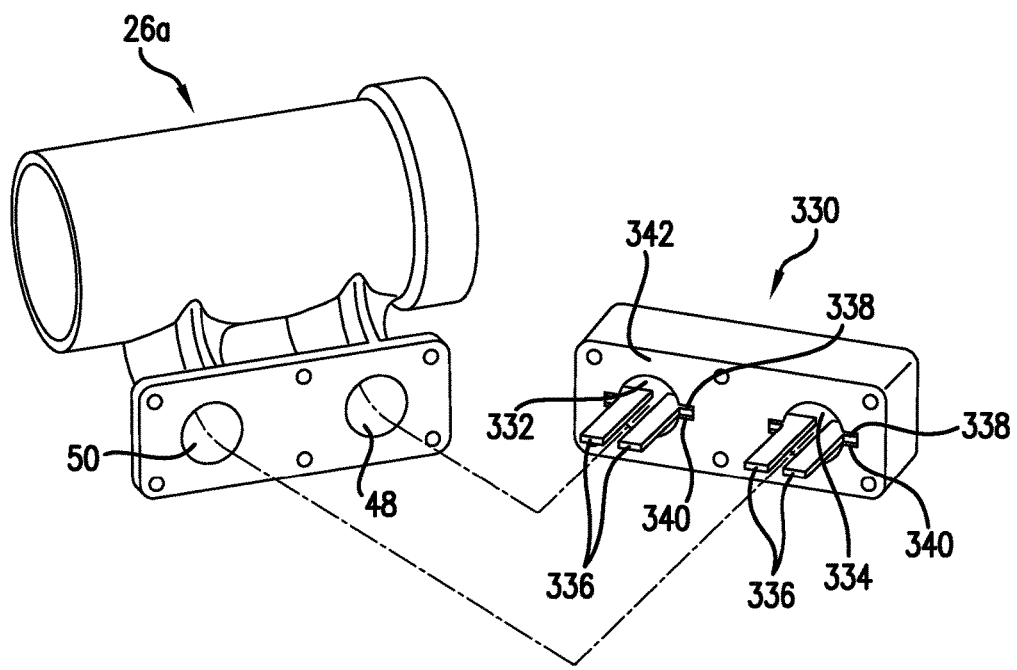
FIG.17

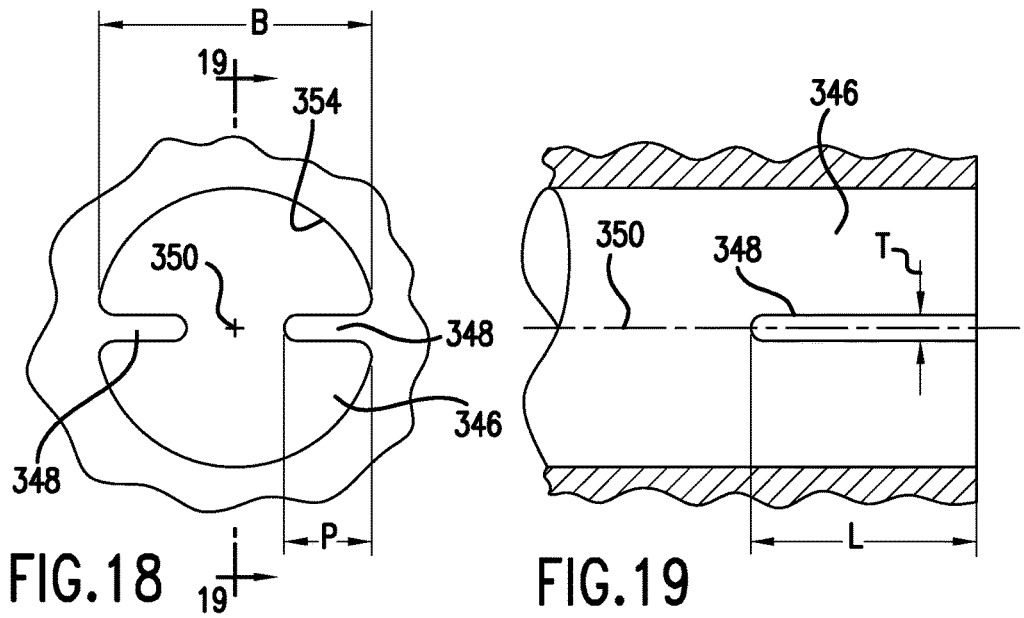
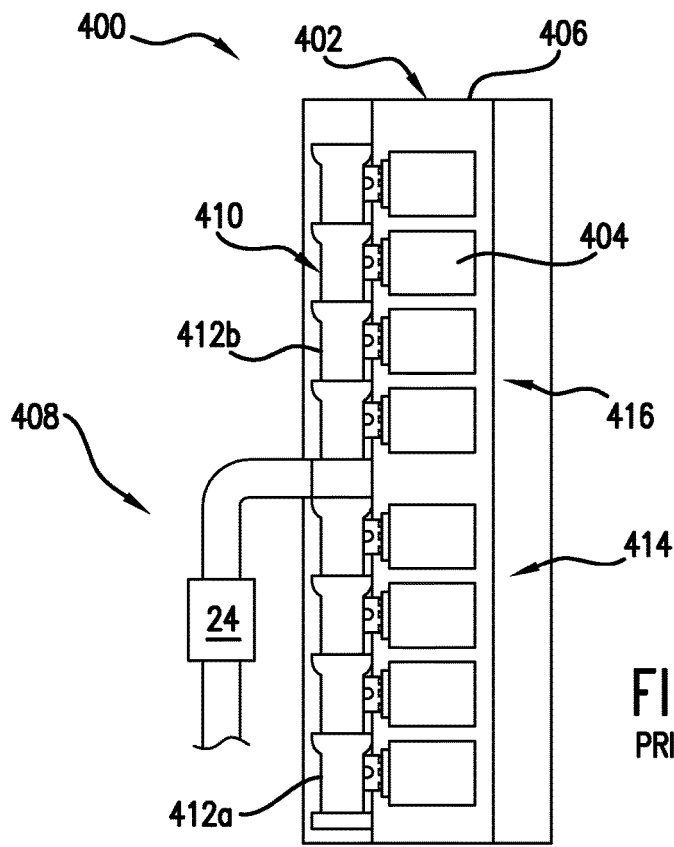
FIG. 18
FIG. 19
FIG. 20 PRIOR ART

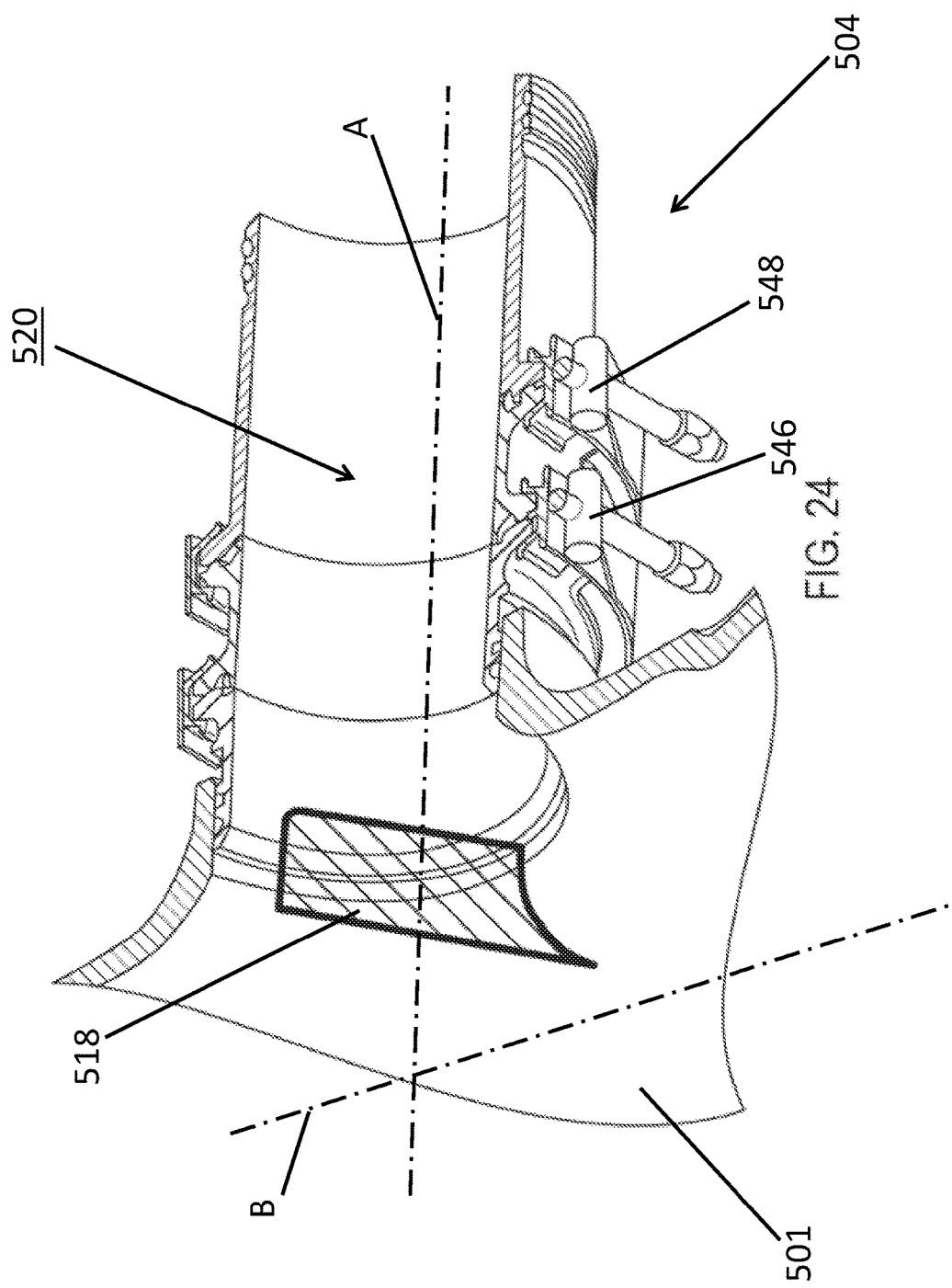

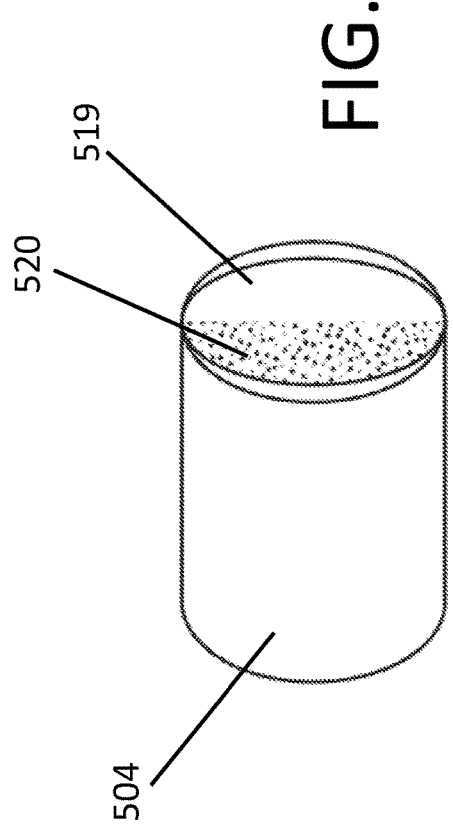
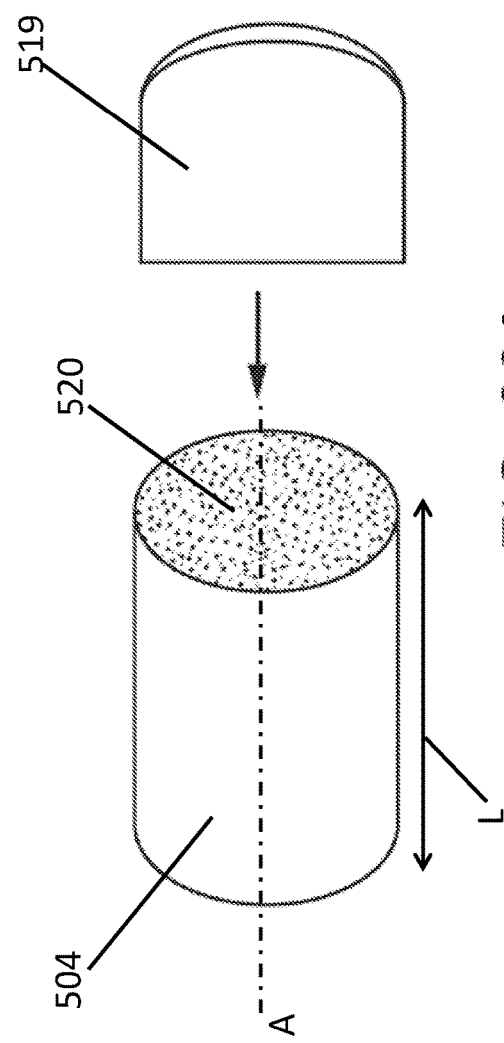

AIR INTAKE SYSTEM FOR INTERNAL COMBUSTION ENGINE

PRIORITY

The present application is a continuation in part of U.S. patent application Ser. No. 14/489,584 titled AIR INTAKE SYSTEM FOR INTERNAL COMBUSTION SYSTEM, filed Sep. 18, 2014, which is a divisional of U.S. patent application Ser. No. 13/782,997 titled AIR INTAKE SYSTEM FOR INTERNAL COMBUSTION ENGINE, filed Mar. 1, 2013, the priority of which is hereby claimed and the disclosures of which are hereby incorporated by reference.

TECHNICAL FIELD

This disclosure relates to an air intake system for internal combustion engines, and more particularly to an air intake system, including fin or rib portions positioned at an interface between the air intake system and a combustion chamber of the internal combustion engine, where the fin or rib portions may be integrated into the air intake system.

BACKGROUND

Internal combustion engines require intake air be introduced in a combustion chamber as part of a combustion process. The intake air is typically introduced in the combustion chamber in a way that causes the intake air to swirl in the combustion chamber, which helps to mix the air and fuel introduced to the combustion chamber. Uniform and consistent mixing of intake air provides consistent power output from each combustion chamber and can provide decreased emissions, especially decreased particulate emissions, also described as smoke.

SUMMARY

According to an embodiment of the present disclosure, an internal combustion engine is provided. The internal combustion engine comprises an intake manifold having an intake manifold axis; a plurality of jumper tubes each coupled to the intake manifold and at least one cylinder head, the plurality of jumper tubes each having a passageway, and a central axis; and a fin coupled to the intake manifold and positioned adjacent to an interface where the jumper tube and the intake manifold are coupled, wherein the fin has a plane that is substantially perpendicular to the intake manifold axis.

According to another embodiment of the present disclosure, An internal combustion engine, comprising: an intake manifold; a plurality of jumper tubes coupled to the intake manifold and at least one cylinder head, the plurality of jumper tubes each having a passageway, and a central axis; wherein at least one of the plurality of jumper tubes further include at least one of a fin portion or a rib portion, the at least one of the fin portion or the rib portion extending inwardly from the interior surface of the jumper tube within the passageway.

According to yet another embodiment of the present disclosure, An internal combustion engine, comprising: an intake manifold; plurality of jumper tubes coupled to the intake manifold and at least one cylinder head, the plurality of jumper tubes each having a passageway, and a central axis; the jumper tubes including a first portion coupled to the intake manifold, a third portion coupled to the at least one cylinder head, and a second portion coupled to the first portion and the second portion such that the second portion of the jumper tube can be removed without removing the intake manifold or the least one cylinder head.

Advantages and features of the embodiments of this disclosure will become more apparent from the following detailed description of exemplary embodiments when viewed in conjunction with the accompanying drawings.

BRIEF DESCRIPTION OF THE DRAWINGS

FIG. 15 is an end view of a transverse airflow passage in accordance with an eighth exemplary embodiment of the present disclosure.

FIG. 16 is an end view of a transverse airflow passage in accordance with a ninth exemplary embodiment of the present disclosure.

FIG. 17 is an exploded perspective view of a manifold portion and a spacer portion in accordance with a tenth exemplary embodiment of the present disclosure.

FIG. 18 is an end view of a transverse airflow passage showing certain features of the present disclosure.

FIG. 19 is a sectional view of the transverse airflow passage of FIG. 17 along the lines 18-18.

FIG. 20 is a plan view of a portion of a second conventional internal combustion engine.

FIG. 24 is a sectional perspective view of the jumper tube of an alternate embodiment of the intake manifold portion of FIG. 21 taken along the lines 23-23.

FIG. 26A is an exploded perspective view of a jumper tube of the intake manifold portion of FIG. 21 and a fin in accordance with an embodiment of the present disclosure.

FIG. 26B is a perspective view of the jumper tube and the fin of FIG. 26A in accordance with the present disclosure.

DETAILED DESCRIPTION

Figure 1:
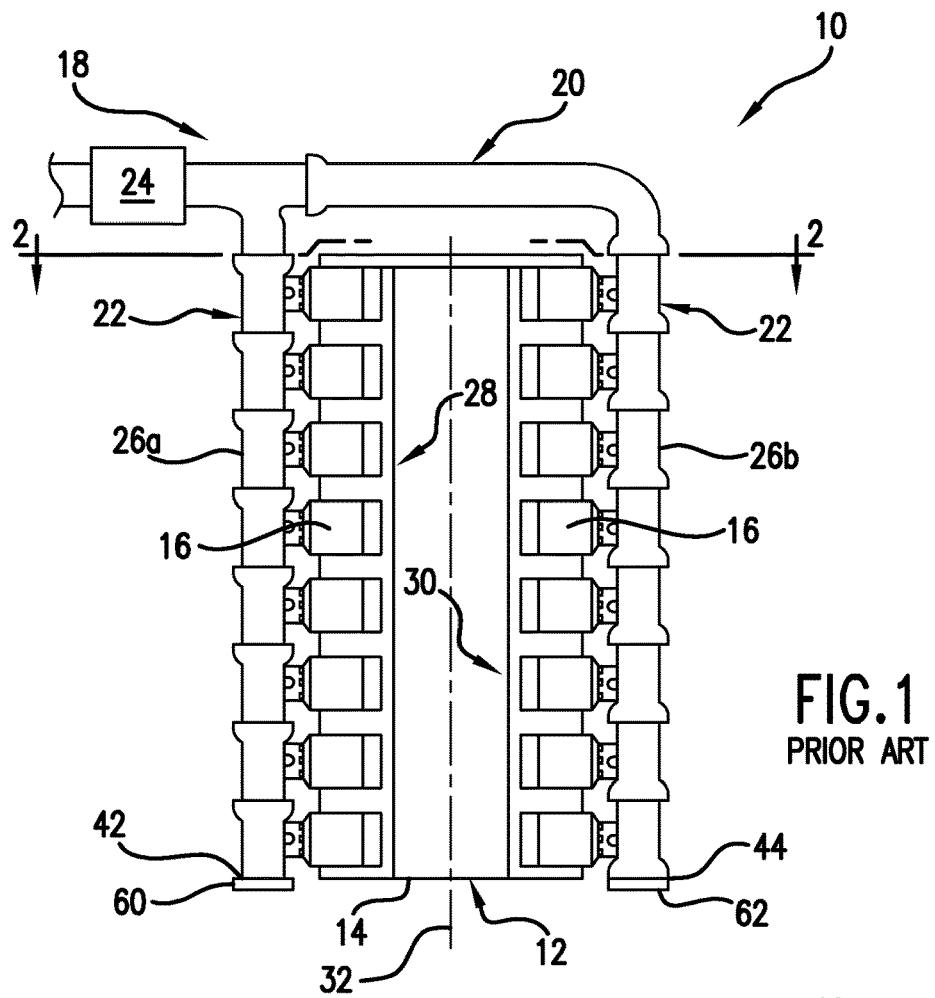
FIG. 1 is a plan view of a portion of a first conventional internal combustion engine.

Referring to FIG. 1, a portion of an internal combustion engine is shown as a simplified schematic and generally indicated at 10. Engine 10 includes an engine body 12, which includes an engine block 14 and a plurality of cylinders (not shown). Engine body 12 also includes a plurality of cylinder heads 16, each of which covers one cylinder and works with other elements of engine body 12 to form a plurality of combustion chambers. Engine 10 also includes an air intake system 18, which includes an intake air circuit 20 and a pair of intake manifolds 22 positioned along intake air circuit 20, each intake manifold 22 being attached to engine body 12. Air intake system 18 may also include a turbocharger 24 positioned along intake air circuit 20. Each intake manifold 22 includes a plurality of identically configured intake manifold portions 26a and 26b. The combustion chambers, cylinder heads 16, and intake manifold portions 26a are arrayed in a left bank or side 28 and the combustion chambers, cylinder heads 16, and intake manifold portions 26b a right bank or side 30, which may form a "V" configuration or a straight configuration. Left bank 28 and right bank 30 are arranged on opposite sides of a vertically extending engine body plane 32. Engine 10 may include other elements and systems (not shown), such as a fuel system, an exhaust system, a control system, and an aftertreatment system.

Engine 10 is of a size class that has relatively low volume production. To minimize cost in engines having relatively low production volume, intake manifold portions 26a and 26b are identically configured, and cylinder heads 16 are identically configured. In the context of this disclosure, "identically configured" means that each intake manifold portion 26a and 26b has similarly oriented airflow passages, and similarly configured mounting locations. Because of the identical configuration, each intake manifold portion 26a and 26b is interchangeable with any other intake manifold portion 26a or 26b. Each intake manifold portion 26a or 26b is fluidly connected to one combustion chamber. Each intake manifold portion 26a or 26b may be directly attached to one cylinder head 16. In the exemplary embodiment, each intake manifold portion 26a or 26b is connected to at least one adjacent intake manifold portion 26a or 26b. Regardless of engine size, it is important for airflow into the combustion chambers to provide consistent air motion as intake air flows into the combustion chambers to provide similar output power between combustion chambers and to have a uniform flow of emissions from the engine and, if applicable, into the aftertreatment system so that the aftertreatment system is able to remove or neutralize emissions optimally. The applicant has determined through extensive experimentation and modeling that the configuration of intake manifold portions 26a and 26b leads to a difference between the amount of swirl in left bank 28 and the amount of swirl in right bank 30. By modifying the intake manifold portions from those of the prior art, the applicant has developed intake manifold portions that provide significant improvements in swirl uniformity in the combustion chambers of left bank 28 and right bank 30. By optimizing the amount of swirl in the combustion chamber, particulate emissions, also called smoke, is minimized, and consistency of power output is improved cylinder to cylinder and between left bank 28 and right bank 30.

Figure 3:
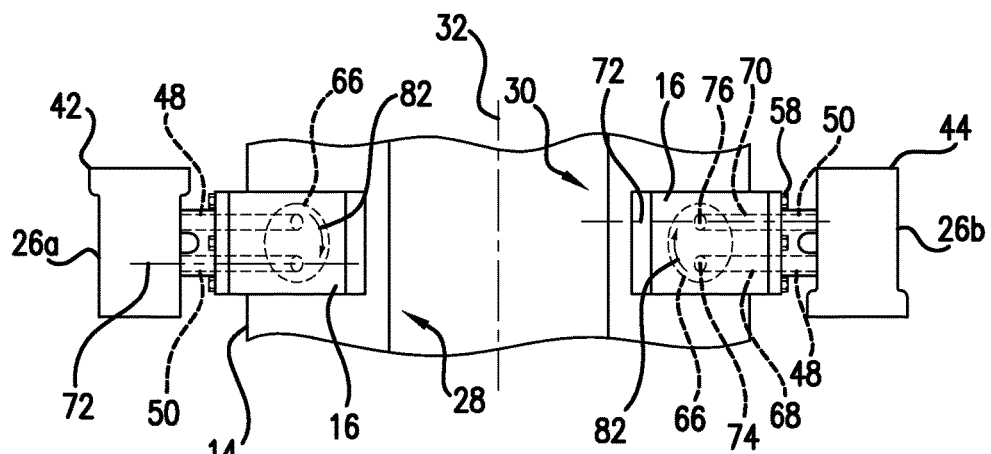
FIG. 3 is a plan view of a cylinder head and an intake manifold portion from a left bank side of the internal combustion engine of FIG. 1, and a cylinder head and an intake manifold from a right bank side of the internal combustion engine of FIG. 1.
Figure 4:
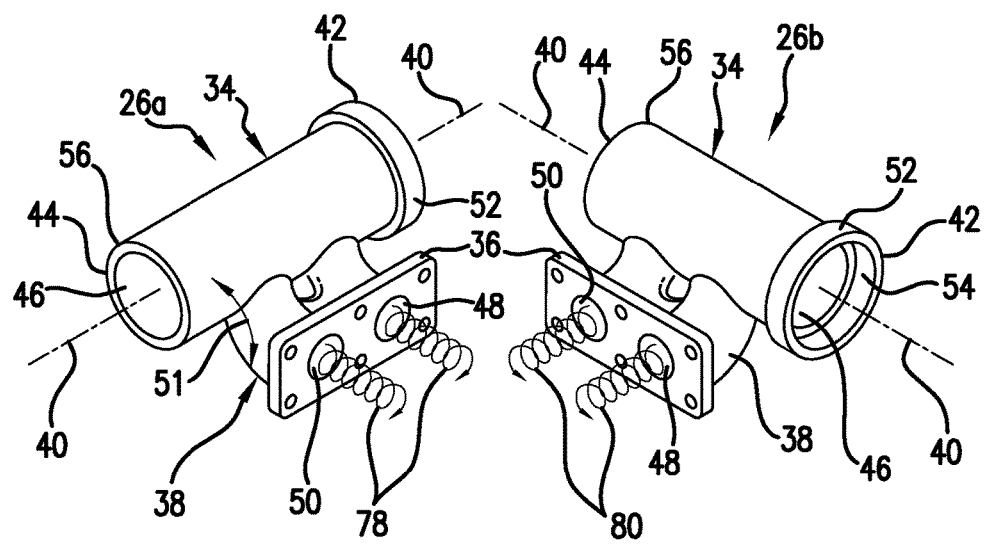
FIG. 4 is a perspective view of one left bank intake manifold portion and one right bank intake manifold portion of FIG. 3 showing a stylized airflow from each intake manifold portion.

Referring to FIG. 3, a portion of left bank 28 and a portion of right bank 30 are shown. As described hereinabove, and as particularly shown in FIG. 4, each intake manifold portion 26a and 26b is identically configured. Each intake manifold portion 26a and 26b includes a body portion 34, a plate portion 36, and a connection portion 38 connecting plate portion 36 to body portion 34. Body portion 34 includes body longitudinal axis 40, a first end 42, a second end 44 and a longitudinal airflow passage 46 extending along longitudinal axis 40 from first end 42 to second end 44. Second end 44 includes an external or outside diameter 56. Each intake manifold portion 26a and 26b further includes a first transverse airflow passage 48 and a second transverse airflow passage 50 that extend from plate portion 36 through connection portion 38 to connect to longitudinal airflow passage 46. First transverse airflow passage 48 and second transverse airflow passage 50 connect to longitudinal airflow passage 46 at a transverse passage connection angle 51 that in the exemplary embodiment is about 90 degrees.

Figure 2:
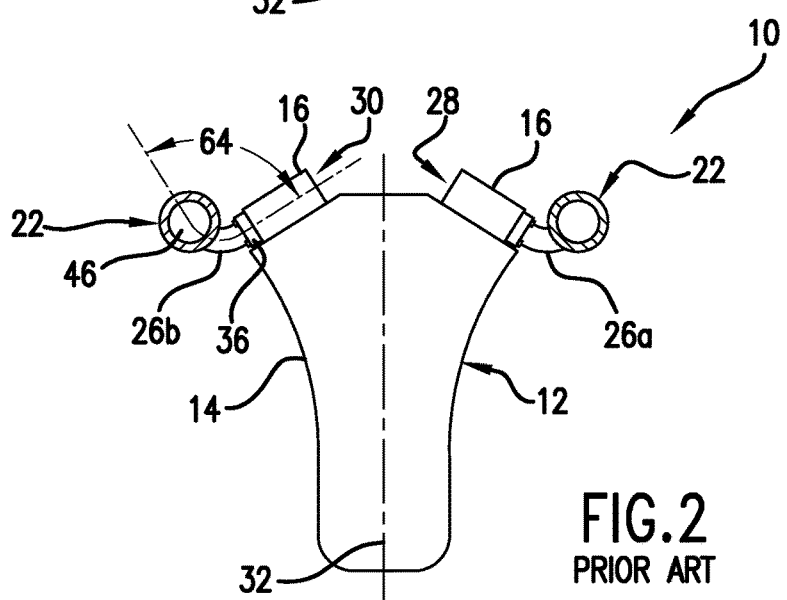
FIG. 2 is an end elevation view of the internal combustion engine of FIG. 1 along the lines 2-2.

First end 42 includes a flange portion 52 that includes an internal or inside diameter 54 sized to accept outside diameter 56 of second end 44, which permits inserting second end 44 of one intake manifold portion 26a or 26b within first end 42 of another intake manifold portion 26a or 26b. When each intake manifold portion 26a or 26b is positioned on engine 10, each plate portion 36 is secured to one cylinder head 16 and may be held in place by a plurality of fasteners 58, clamps, or other mechanisms. Each second end 44 is positioned within first end 42 of an adjacent intake manifold portion 26a or 26b, within another element of intake circuit 20, or covered by a cap 60, as shown in FIG. 1. Each connection to second end 44 is sealed using a gasket material, or may be sealed using other techniques, such as welding. Similarly, each first end 42 connects to or mates with second end 44 of an adjacent intake manifold portion 26a or 26b, connects to or mates with another element of intake circuit 20, or is covered by a cap 62, as shown in FIG. 1. Each connection to first end 42 is sealed using a gasket material, or may be sealed using other techniques, such as welding. In order to keep engine 10 compact to meet customer expectations, intake manifolds 22 are located in a position that requires connection portion 38 to be curved or curvilinear and to form a transverse passage angle 64, as shown in FIG. 2. The configuration of connection portion 38 thus causes first transverse airflow passage 48 and second transverse airflow passage 50 to be curved or curvilinear and to include transverse passage angle 64. In an exemplary embodiment, transverse passage angle 64 may be in the range 70 degrees to 135 degrees.

As described hereinabove, each cylinder head 16 is attached to or mounted on engine block 14 and covers a combustion chamber, a portion of which may be seen in FIG. 3 as a hidden line and generally indicated at 66. Cylinder head 16 also includes a first head passage 68 and a second head passage 70. First head passage 68 connects first transverse airflow passage 48 to combustion chamber 66. First head passage 68 extends generally along a flat plane until it connects with combustion chamber 66 at one side of combustion chamber 66 at a first chamber opening 74. Second head passage 70 connects second transverse airflow passage 50 to combustion chamber 66. Second head passage 70 extends along a flat plane 72, but prior to opening into combustion chamber 66, second head passage 70 extends in a clockwise direction from flat plane 72, connecting to combustion chamber 66 at a second chamber opening 76, when viewing engine 10 from the direction shown in FIGS. 1 and 3.

When engine 10 operates, outside or external air flows from an intake opening (not shown) into intake air circuit 20. The air may flow through one or more filters (not shown) and, in the exemplary embodiment, through turbocharger 24. Intake air then flows into intake manifolds 22, one at left bank 28 and one at right bank 30. Though not shown, air may also flow through a charge air cooler and through other elements upstream from intake manifolds 22. Once in intake manifold 22, the intake air flows into each intake manifold portion 26a or 26b through longitudinal airflow passage 46. In left bank 28, air flows into longitudinal airflow passage 46 from first end 42 of each intake manifold portion 26a. Air then flows into first transverse airflow passage 48 and second transverse airflow passage 50 of intake manifold portion 26a, moving through a first angle, which is transverse passage connection angle 51. As the airflow passes through first transverse airflow passage 48 and through second transverse airflow passage 50, the airflow flows through a second angle, which is transverse passage angle 64. Airflow exiting intake manifold portion 26a through plate portion 36 is shown as a stylized line and indicated at 78 in FIG. 4.

In right bank 30, air flows into longitudinal airflow passage 46 from second end 44 of each intake manifold portion 26b. Air then flows into first transverse airflow passage 48 and second transverse airflow passage 50 of intake manifold portion 26b, moving through a first angle, which is transverse passage connection angle 51. As the airflow passes through first transverse airflow passage 48 and through second transverse airflow passage 50, the airflow flows through a second angle, which is transverse passage angle 64. Airflow exiting intake manifold portion 26b through plate portion 36 is shown as a stylized line and indicated at 80 in FIG. 4. Airflow exiting intake manifold portions 26a and 26b enters first head passage 68 and second head passage 70 of each respective cylinder head 16. The airflow enters combustion chamber 66 from first chamber opening 74 of first head passage 68 and from second chamber opening 76 of second head passage 70. The effect of the position of first chamber opening 74 and second chamber opening 76 with respect to combustion chamber 66 is to induce a clockwise combustion chamber swirl to intake air flowing into combustion chamber 66 when viewing engine 10 from the direction shown in FIGS. 1 and 3, indicated at 82 in FIG. 3.

Engine 10 works well for its intended purpose, but engine 10 has challenges. Applicant recognized that one challenge with engine 10 is that output power and emissions between left bank 28 and right bank 30 are different. What was not understood was the reason for the differences between left bank 28 and right bank 30. Applicant analyzed and tested each individual component of left bank 28 and right bank 30 extensively. What the Applicant unexpectedly learned is that airflow 78 exits intake manifold portion 26a with a clockwise rotation and airflow 80 exits intake manifold portion 26b with a counterclockwise rotation. This rotation is caused by the airflow changing direction a first time through transverse passage connection angle 51 and a second time through transverse passage angle 64. Because the direction of transverse passage angle 64 is opposed on opposite sides of engine 10, i.e., the left side and the right side, the direction of airflow rotation that enters combustion chamber 66 from first head passage 68 and second head passage 70 is also opposite on the left side and the right side, i.e., clockwise versus counterclockwise. Applicant also learned that the direction of rotation of airflow 78 and airflow 80 affected the amount of swirl in combustion chambers 66.

In one engine configuration, the amount of swirl from airflow into each left bank 28 combustion chamber was 20% higher than expected. The amount of swirl from airflow into each right bank 30 combustion chamber 66 was 30% lower than expected. Thus, the swirl in right bank 30 was more than 40% different from the swirl in left bank 28. Thus, because of the rotation induced by longitudinal airflow passage 46, first transverse airflow passage 48, and second transverse airflow passage 50, the swirl, also called flow vortices, in each combustion chamber 66 in left bank 28 was actually 20% higher than would be expected if no swirl was introduced by travel through the aforementioned passages. Furthermore, the swirl in each combustion chamber 66 in right bank 30 was actually 30% lower than would be expected if no swirl was introduced by travel through the aforementioned passages. As noted hereinabove, if swirl or flow vortices are too high or too low, smoke emissions increase and power varies between left bank 28 and right bank 30. Thus, the difference in swirl between left bank 28 and right bank 30 was undesirably causing increased particulate emissions and causing undesirable power variations. Flow vortices may also be different from cylinder to cylinder in the same bank, but these differences are typically much less than the difference between banks.

To reduce the amount of airflow rotation induced by the configuration of intake manifold portions 26a and 26b, applicant determined that one or more fin or rib portions placed in first transverse airflow passage 48 and in second transverse airflow passage 50 reduced the rotation of air flowing from first transverse airflow passage 48 and second transverse airflow passage 50 to nearly zero. By reducing the airflow rotation to nearly zero, the swirl in the left bank and right bank combustion chambers became nearly equal, which improved the uniformity of mixing of air and fuel between left bank 28 and right bank 30. The improved mixing improved the consistency of power output from left bank 28 and right bank 30 as well as the level of emissions from left bank 28 and right bank 30, nearly eliminating the previously observed differences.

While internal combustion engine 10 shows a side-by-side configuration for left bank 28 and right bank 30, the definition of left and right bank refers as much to the orientation of airflow through an intake manifold portion as it does to a physical left bank and right bank position. FIG. 20 shows a conventional internal combustion engine 400 including an engine body 402, which further includes a cylinder block 406 to which are attached one or more cylinder heads 404. An air intake system 408 functions similar to intake system 18 of FIG. 1. Intake system 408 includes an intake manifold 410 including a plurality of intake manifold portions 412a and 412b that may be similar to intake manifold portions 26a and 26b. Because air intake system 408 connects to intake manifold 410 in a central location, intake manifold 410 is divided into a left bank 414 and a right bank 416, with air flow through intake manifold portions 412a as previously described for intake manifold portions 26a for left bank 28 and air flow through intake manifold portions 412b as previously described for intake manifold portions 26b for right bank 30. Thus, an inline internal combustion engine may have a left bank and right bank from the perspective of airflow.

Figure 5:
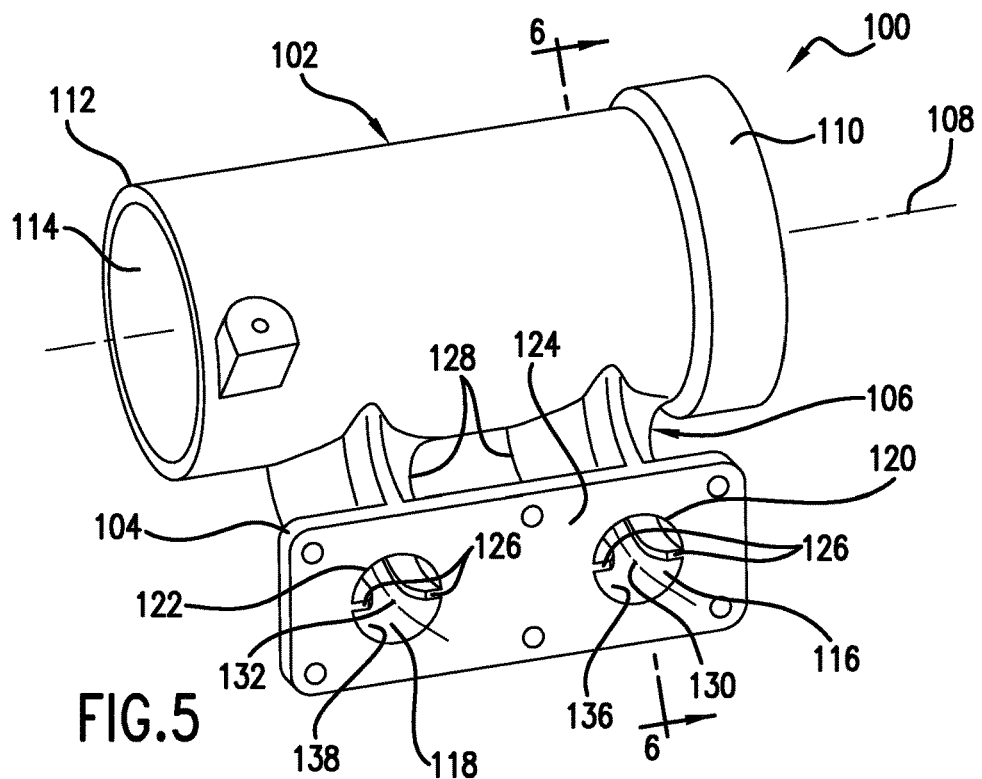
FIG. 5 is a perspective view of an intake manifold portion in accordance with a first embodiment of the present disclosure.
Figure 6:
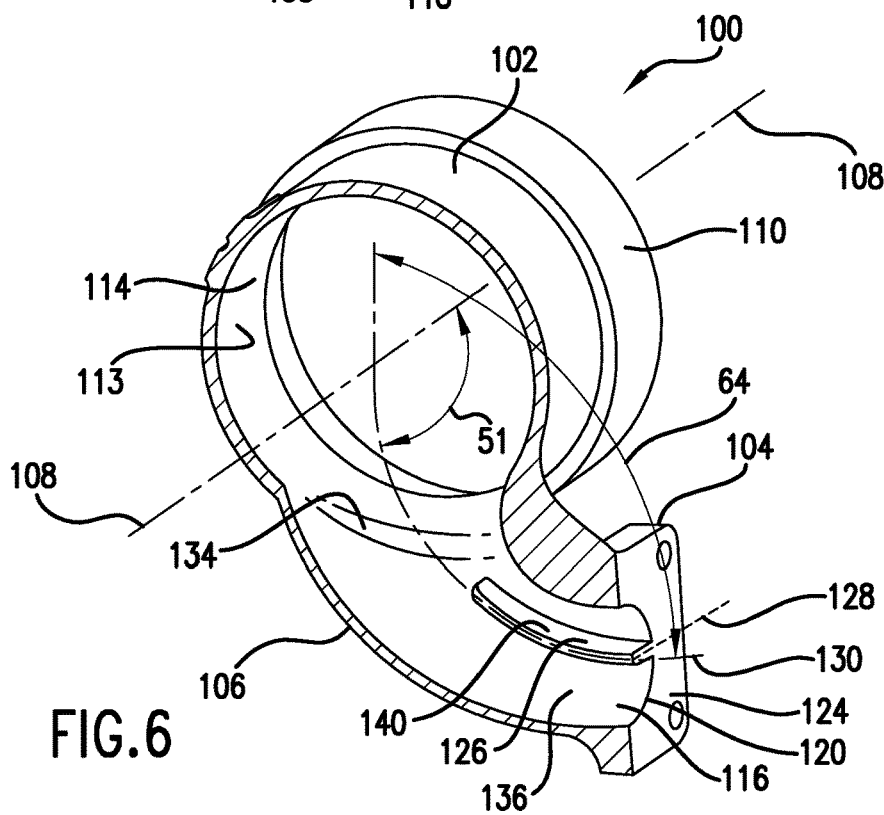
FIG. 6 is a perspective sectional view of the intake manifold portion of FIG. 5 along the lines 6-6 in FIG. 5.

Referring to FIGS. 5 and 6, a first exemplary embodiment intake manifold portion 100 of the present disclosure is shown. As with intake manifold portions 26a and 26b, intake manifold portion 100 includes a body portion 102, a plate portion 104 having an exterior surface 124, and a connection portion 106 extending from body portion 102 to plate portion 104. Intake manifold portion 100 also includes a body longitudinal axis 108, a first end 110, a second end 112, and a body interior surface 113 that forms a longitudinal airflow passage 114 extending along body longitudinal axis 108. Intake manifold portion 100 also includes a first inlet opening 134 formed in body interior surface 113 and a first outlet opening 120 formed in exterior surface 124 of plate portion 104, and a first passage interior surface 136 that forms a first transverse airflow passage 116 positioned or extending between first inlet opening 134 and first outlet opening 120. Thus, first inlet opening 134 is at a first end of first transverse airflow passage 116 and first outlet opening 120 is at a second end of first transverse airflow passage 116. Intake manifold portion 100 further includes a second inlet opening (not shown) formed in body interior surface 113 and a second outlet opening 122 formed in exterior surface 124 of plate portion 104, and a second passage interior surface 138 that forms a second transverse airflow passage 118 positioned or extending between the second inlet opening and second outlet opening 122. Thus, the second inlet opening is at a first end of second transverse airflow passage 118 and second outlet opening 122 is at a second end of second transverse airflow passage 118. First transverse airflow passage 116 includes a longitudinal first transverse passage axis 130 that extends through the center of first transverse airflow passage 116 between first inlet opening 134 and first outlet opening 120. Second transverse airflow passage 118 includes a longitudinal second transverse passage axis 132 that extends through the center of first transverse airflow passage 116 between the second inlet opening and second outlet opening 122. Each longitudinal transverse passage axis extends at transverse passage connection angle 51 to longitudinal airflow passage 114, and an extension of each longitudinal transverse passage axis may intersect body longitudinal axis 108. In an exemplary embodiment, transverse passage connection angle 51 is 90 degrees, but may be at other angles. Each transverse airflow passage extends through connection portion 106 to plate portion 104. First transverse passage axis 130 extends from plate portion 104 at transverse passage angle 64 to the portion of transverse passage axis 130 that extends into longitudinal airflow passage 114 or that may intersect body longitudinal axis 108. When intake manifold portion 100 is positioned on engine body 12, first outlet opening 120 and second outlet opening 122 are in fluid communication with combustion chamber 66, thus providing a flow path for intake air to reach combustion chamber 66.

Intake manifold portion 100 further includes at least one fin or rib portion 126 formed in at least one of plate portion 104 and connection portion 106. Each fin or rib portion 126 extends radially inward from either first passage interior surface 136 into first transverse airflow passage 116 and toward first transverse passage axis 130, or from second passage interior surface 138 into second transverse airflow passage 118 and toward second transverse passage axis 132. Each fin or rib portion 126 extends in a direction that is longitudinally along a respective transverse airflow passage, i.e., in the same direction that either first transverse passage axis 130 or second transverse passage axis 132 of the respective transverse airflow passage extends. Airflow also flows through first transverse airflow passage 116 along first transverse passage axis 130 toward combustion chamber 66 and through second transverse airflow passage 118 along second transverse passage axis 132 toward combustion chamber 66. For ease of casting, each fin or rib portion 126 may follow a casting parting line 128 that may be formed during fabrication of intake manifold portion 100. In the exemplary embodiment, first transverse airflow passage 116 includes a pair of oppositely disposed, horizontally extending co-planar fin portions 126, and second transverse airflow passage 118 includes a pair of oppositely disposed, horizontally extending co-planar fin portions 126. In the exemplary embodiment, each fin portion 126 in the left bank is co-planar with all other fin portions 126 in the left bank or side, and each fin portion 126 is co-planar with all other fin portions 126 in the right bank or side. However, in the exemplary embodiment, each fin portion 126 in one bank is not co-planar with any fins in an opposite bank, though they may be in another embodiment. Because fin portions 126 extend either along the first transverse passage axis 130 of first transverse airflow passage 116 or along second transverse passage axis 132 of second transverse airflow passage 118, fin portions 126 may have a curvature 140, which may be seen in FIG. 6. Fin portions 126 are disposed closer to either first outlet opening 120 or second outlet opening 122 than to first inlet opening 134 and the second inlet opening (not shown) because the swirl vortices are greater after each transverse airflow passage has extended through curvilinear transverse passage angle 64. In addition, positioning fin portions 126 closer to an outlet opening may make forming fin portions 126 during manufacturing easier. In the exemplary embodiment shown in FIG. 6, fin portions 126 extend longitudinally from either first outlet opening 120 or second outlet opening 122.

In the following embodiments, elements having the same number as the first exemplary embodiment function similar to the first exemplary embodiment and any description of previously described elements is for the purpose of clarity.

Figure 7:
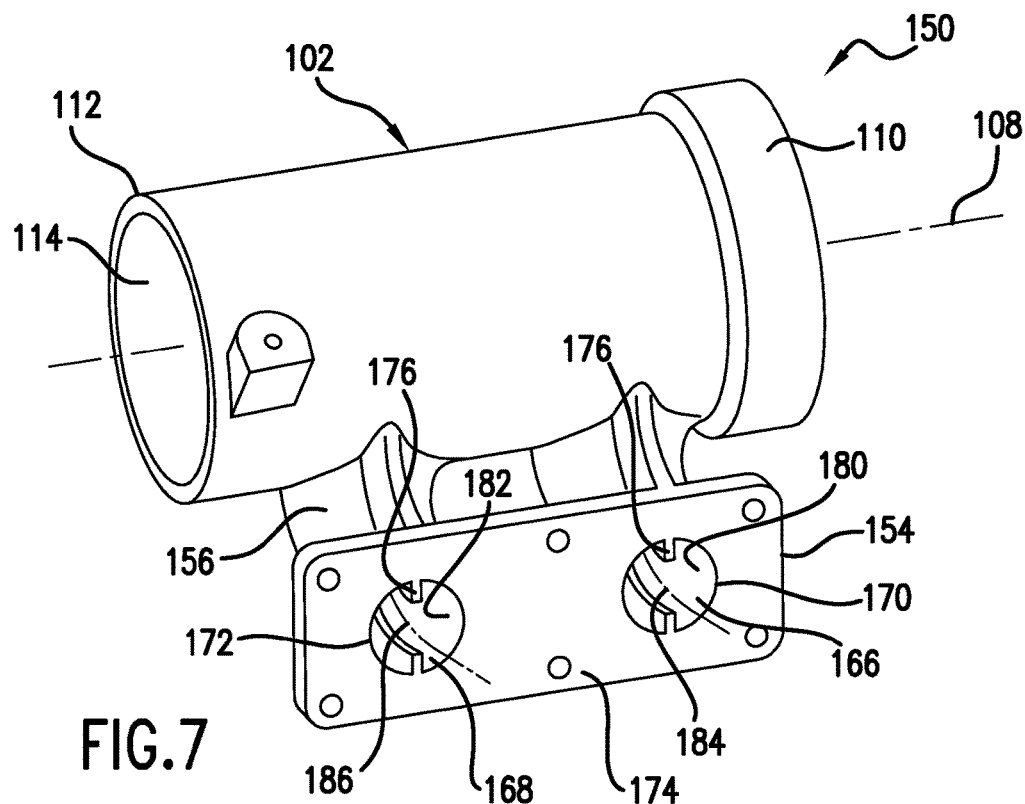
FIG. 7 is a perspective view of an intake manifold portion in accordance with a second embodiment of the present disclosure.

Referring to FIG. 7, a second exemplary embodiment intake manifold portion 150 is shown. As with intake manifold portions 26a, 26b, and 100, intake manifold portion 150 includes body portion 102, a plate portion 154 having an exterior surface 174, and a connection portion 156 extending from body portion 102 to plate portion 154. Intake manifold portion 150 also includes a first inlet opening (not shown) similar to inlet opening 134 and a first outlet opening 170 formed in exterior surface 174 of plate portion 154, and a first passage interior surface 180 that forms a first transverse airflow passage 166 positioned or extending between the first inlet opening and first outlet opening 170. Intake manifold portion 150 further includes a second inlet opening (not shown) similar to that described hereinabove and a second outlet opening 172 formed in exterior surface 174 of plate portion 154, and a second passage interior surface 182 that forms a second transverse airflow passage 168 positioned or extending between the second inlet opening and second outlet opening 172. First transverse airflow passage 166 includes a longitudinal first transverse passage axis 184 that extends between the first inlet opening and first outlet opening 170. Second transverse airflow passage 168 includes a longitudinal second transverse passage axis 186 that extends between the second inlet opening and second outlet opening 172. Each transverse airflow passage extends through connection portion 156 to plate portion 154.

Intake manifold portion 150 further includes at least one fin or rib portion 176 formed in at least one of plate portion 154 and connection portion 156. Each fin or rib portion 176 extends radially inward from either first passage interior surface 180 into either first transverse airflow passage 166 or from second passage interior surface 182 into second transverse airflow passage 168. Each fin or rib 176 may be oriented in a direction perpendicular to the direction of ribs 126 in the previous embodiment, and thus may be oriented in a generally vertical direction. In the exemplary embodiment, each fin or rib 176 is parallel to all other fin or rib portions 176 in the left bank or side and the right bank or side. Each fin or rib portion 176 extends in a direction that is longitudinally along a respective transverse airflow passage, i.e., in the same direction that either first transverse passage axis 184 or second transverse passage axis 186 of the respective airflow passage extends, which is also the direction of airflow through first transverse airflow passage 166 and second transverse airflow passage 168. In the exemplary embodiment, intake manifold portion 150 includes a pair of oppositely disposed fin portions 176. Fin portions 176 are disposed closer to either first outlet opening 170 or second outlet opening 172 than to the first inlet opening (not shown) and the second inlet opening (not shown) because the swirl vortices are greater after each transverse airflow passage has extended through previously described transverse passage angle 64, and thus fin or rib portions 176 are most effective in that location. In addition, positioning fin or rib portions 176 closer to an outlet opening may make forming fin or rib portions 176 during manufacturing easier. In the exemplary embodiment shown in FIG. 7, fin or rib portions 176 extend longitudinally from either first outlet opening 170 or second outlet opening 172.

Figure 8:
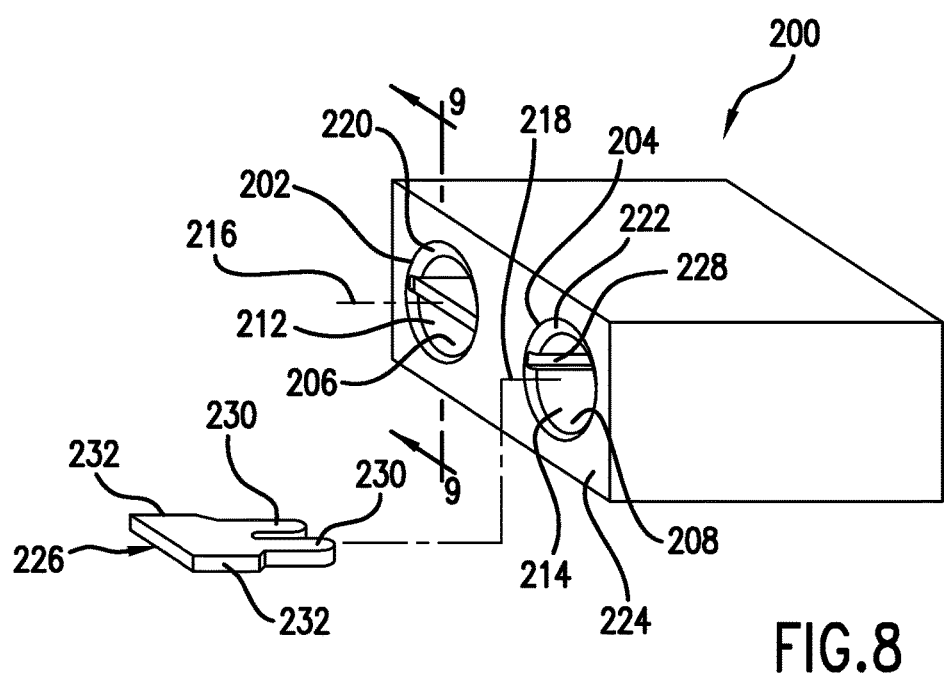
FIG. 8 is a perspective view of a part of a cylinder head in accordance with a third embodiment of the present disclosure.
Figure 9:
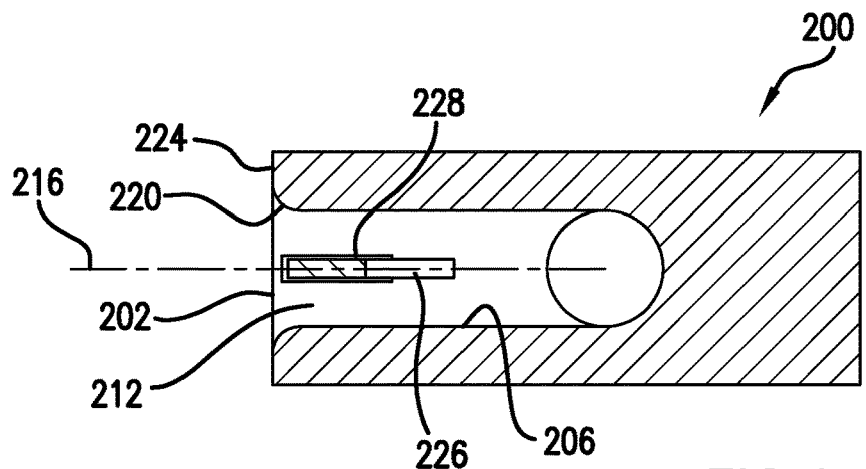
FIG. 9 is a sectional view of the cylinder head of FIG. 8 along the lines 9-9.
Figure 10:
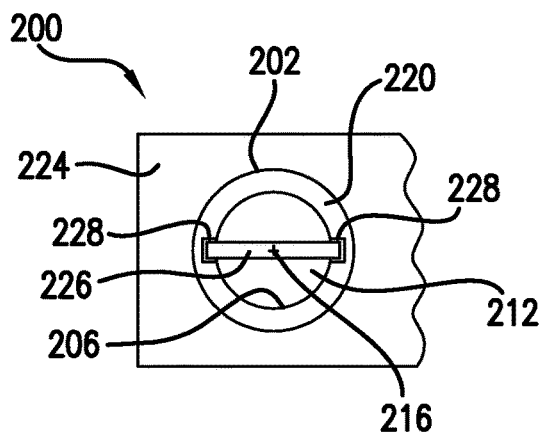
FIG. 10 is an elevation view of a part of the cylinder head of FIG. 8.

Referring to FIGS. 8-10, a cylinder head in accordance with a third exemplary embodiment of the present disclosure is shown and generally indicated at 200. Cylinder head 200 includes an exterior surface 224 and a first head inlet opening 202 and a second head inlet opening 204 formed in exterior surface 224. Cylinder head 200 also includes a first head interior surface 206 extending inwardly from first head inlet opening 202 that forms a first head passage 212. Cylinder head 200 further includes a second head interior surface 208 extending inwardly from second head inlet opening 204 that forms a second head passage 214. First head passage 212 extends from first head inlet opening 202 to a combustion chamber, in a manner that is similar to first head passage 68 shown in FIG. 3. Second head passage 214 extends from second head inlet opening 204 to a combustion chamber, in a manner that is similar to second head passage 70 shown in FIG. 3. First head inlet opening 202 fluidly connects an airflow passage such as first transverse airflow passage 48 to first head passage 212. Second head inlet opening 204 fluidly connects an airflow passage such as second transverse airflow passage 50 to second head passage 214. First head passage 212 includes a longitudinal first head passage axis 216 that extends along first head passage 212, and may be the along the centerline of first head passage 212. Second head passage 218 includes a longitudinal second head passage axis 218 that extends along second head passage 214, and may be along the centerline of second head passage 214.

Cylinder head 200 further includes one or more grooves, slots, or channels 228 formed in first head interior surface 206 and second head interior surface 208. Each groove or slot 228 extends in a direction that is along either first head passage axis 216 or second head passage axis 218. While previously described grooves or slots 228 are described as extending from various openings in the previous embodiments, each groove or slot 228 in the third embodiment extends from a spaced distance from either first head inlet opening 202 or second head inlet opening 204. The reason for the spaced distance is that first head passage 212 includes a bell mouth portion 220 positioned next to or adjacent to first head inlet opening 202 and second head passage 214 includes a bell mouth portion 222 positioned next to or adjacent to second head inlet opening 204. Each groove or slot may be cast within cylinder head 200 or may be machined into cylinder head 200.

A fin insert portion 226 is sized and shaped to mate with grooves 228. Fin insert portion 226 includes a longitudinally extending portion 230, and one or more engaging portions 232 that are sized to mate with grooves 228. Fin insert portion 226 is positioned within at least one groove 228 by installing fin insert portion 226 into first head inlet opening 202 or into second head inlet opening 204. Fin insert portion 226 may be a press fit with groove 228, may be welded into groove 228, or may be secured within groove 228 by other means, which means that one groove 228 may be sufficient to properly position fin insert portion 226. If fin insert portion 226 is a loose or slip fit with a pair of grooves 228, when an intake manifold portion such as intake manifold portion 26a or 26b is attached, mounted or positioned on cylinder head 200, the size and position of intake manifold portion 26a or 26b retains fin insert portion 226 within grooves 228. While fin insert portion 226 may mate with grooves 228 for ease of manufacture, fin insert portion 226 may be held in place by a suitable fixture and then attached to first head interior surface 206 of cylinder head 200 that forms first head passage 212 or second head interior surface 208 that forms second head passage 214 by a weld or by other suitable attachment technique. In an alternate embodiment, fin insert portion 226 is integrally formed with the first head interior surface 206 of cylinder head 200.

Figure 11:
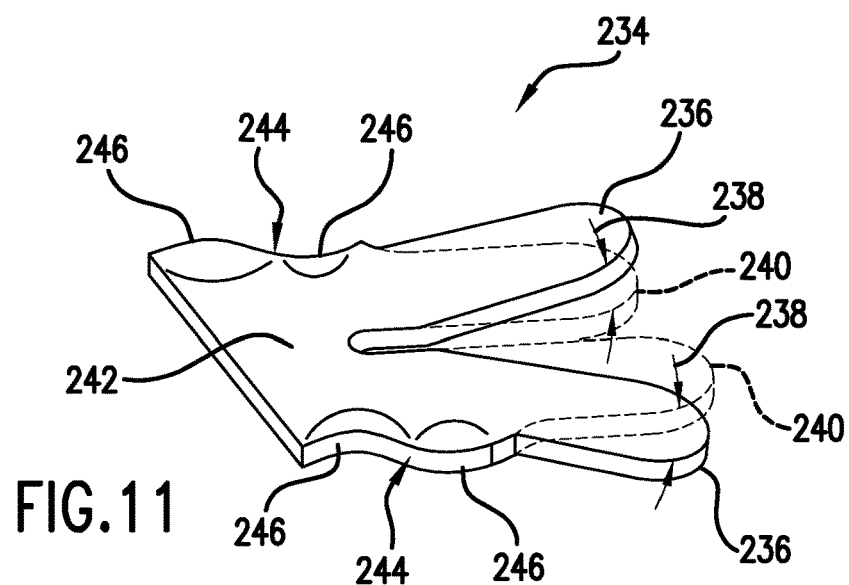
FIG. 11 is a perspective view of a fin insert portion compatible with the cylinder head of FIG. 8 in accordance with a fourth embodiment of the present disclosure.

The configuration of cylinder head 200 provides an opportunity to further control airflow entering combustion chamber 66. As shown in FIG. 11, a fin insert portion 234 in accordance with a fourth exemplary embodiment of the present disclosure includes a flat planar portion 242 and one or more longitudinal portions 236 extending from flat planar portion 242. Flat planar portion 242 includes one or more engaging portions 244 that provide a function similar to previously described engaging portions 232. Engaging portions 232 may include deformed portions 246, which may be in the shape of a sine wave or other deformed configuration. Each deformed portion 246 engages with grooves slots or channels 228 and helps to retain fin insert portions 234 within cylinder head 200.

Each longitudinal portion 236 is deflected, bent, or deformed at an insert angle 238 with respect to a flat or planar location or position 240. In an exemplary embodiment, insert angle 238 is in the range zero to ten degrees, and each longitudinal portion 236 is deflected in a direction that is opposite to the other longitudinal portion 236 formed on fin insert portion 234. In other embodiments, insert angle 238 may be in the range zero to thirty degrees, depending on the speed of airflow across fin insert portion 234, the diameter of the associated head passage, and other factors. The advantage to this configuration is that it permits using a single cylinder head 200 for left bank 28 and right bank 30 while enabling modification of airflow through each cylinder head 200. The configuration of fin insert portion 234 may be advantageous for increasing or decreasing swirl in combustion chamber 66 while maintaining consistency of swirl, similar to the modifications of airflow described in FIGS. 12-14 hereinbelow.

Fin insert portion 234 works as follows. Intake air flowing from an intake manifold portion flows into first head inlet opening 202 or second head inlet opening 204. As the intake air enters first head inlet opening 202 or second head inlet opening 204, the intake air contains either clockwise or counterclockwise swirl. As the intake air flows over flat planar portion 242, the intake air swirl is eliminated. As the intake air flows longitudinally along either first head passage 212 or second head passage 214, longitudinal portions 236 will induce a controlled amount of swirl in the intake air. The direction of the swirl depends on the direction of deformation of longitudinal portions 236, which means that the swirl induced by longitudinal portions 236 may be either clockwise or counterclockwise. The magnitude of insert angle 238 determines the magnitude of the induced swirl. As previously noted, insert angle 238 may be in the range plus or minus ten degrees, but may be in the range plus or minus thirty degrees. One reason for these ranges is that, depending on the dimensions of the associated head passage, fin insert portion 234 may present a pressure drop to intake air flow as insert angle 238 increases, reducing the efficiency of engine 10.

Figure 12:
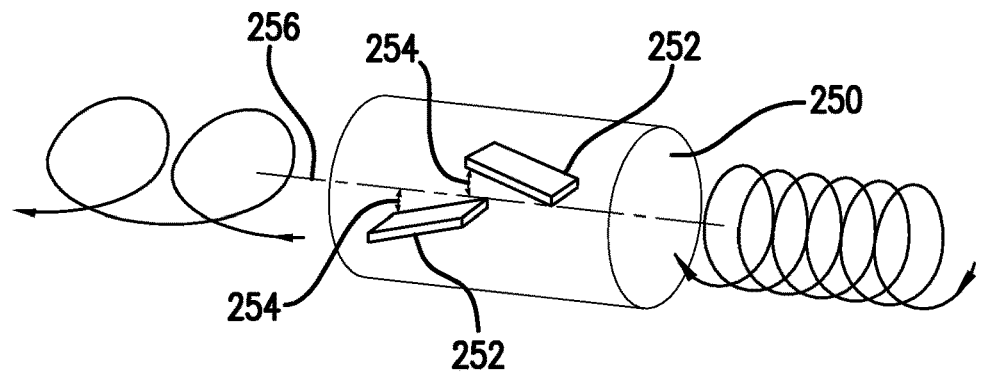
FIG. 12 is a perspective view of a transverse airflow passage in accordance with a fifth exemplary embodiment of the present disclosure.

Referring to FIG. 12, a fifth exemplary embodiment of the present disclosure is shown. For simplicity in explanation, only a representation of a first transverse airflow passage 250 including a longitudinal first transverse passage axis 256 is shown. One or more fin or rib portions 252 extend into first transverse airflow passage 250 and longitudinally along first transverse airflow passage 250 at a fin or rib angle 254 with respect to first transverse passage axis 256 of transverse airflow passage 250. In an exemplary embodiment, fin or rib angle 254 is in the range zero to ten degrees, but may be in the range zero to thirty degrees, depending on factors described hereinabove. The benefit of the configuration shown is that if a clockwise swirl encounters fin or rib portions 252, the amount of swirl is reduced, but remains clockwise. Fin or rib portions 252 may be inserted from an end of first transverse airflow passage 250, may be cast into airflow passage 250, or may be attached to an interior wall forming first transverse airflow passage 250.

Figure 13:
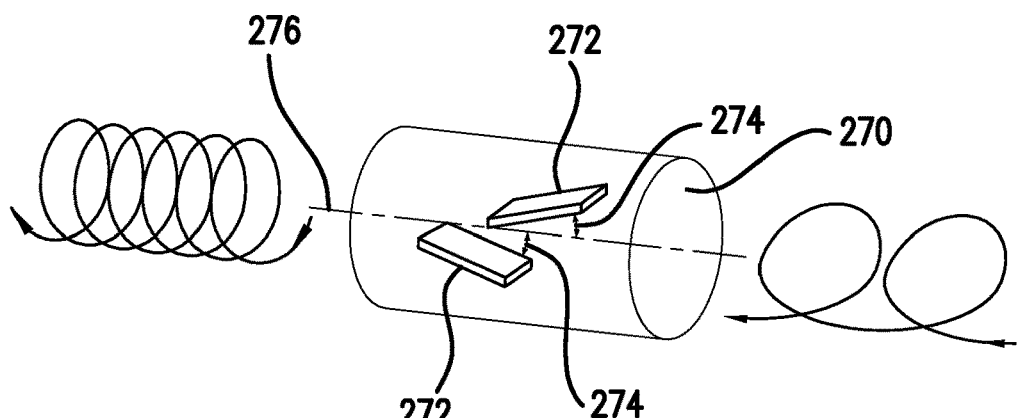
FIG. 13 is a perspective view of a transverse airflow passage in accordance with a sixth exemplary embodiment of the present disclosure.

Referring to FIG. 13, a sixth exemplary embodiment of the present disclosure is shown. For simplicity in explanation, only a representation of a first transverse airflow passage 270 including a longitudinal first transverse passage axis 276 is shown. One or more fin or rib portions 272 extend into first transverse airflow passage 270 and longitudinally along first transverse airflow passage 270 at a fin or rib angle 274 with respect to first transverse passage axis 276 of first transverse airflow passage 270. In an exemplary embodiment, fin or rib angle 274 is in the range zero to ten degrees, but may be in the range zero to thirty degrees, as described hereinabove. The benefit of the configuration shown is that if a low clockwise swirl encounters ribs 272, the amount of swirl is increased, but remains clockwise. Such an increase may be beneficial when entering combustion chamber 66. The fin or rib portions 272 may be inserted from an end of first transverse airflow passage 270, may be cast into first transverse airflow passage 270, or may be attached to an interior wall forming first transverse airflow passage 270.

Figure 14:
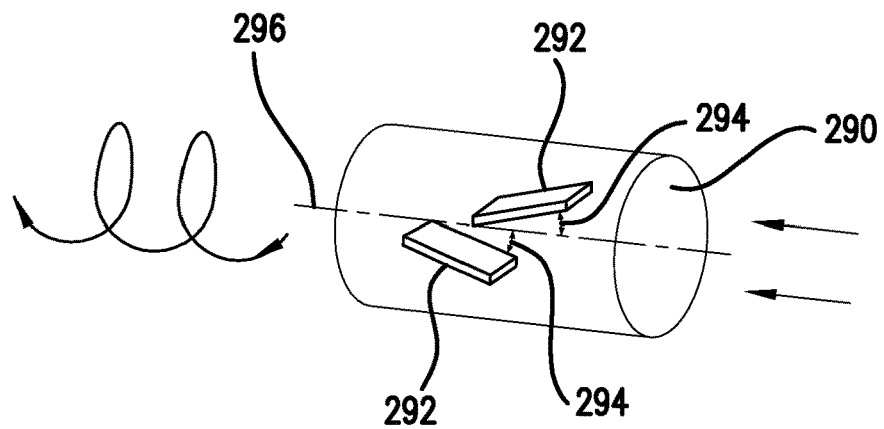
FIG. 14 is a perspective view of a transverse airflow passage in accordance with a seventh exemplary embodiment of the present disclosure.

Referring to FIG. 14, a seventh exemplary embodiment of the present disclosure is shown. For simplicity in explanation, only a representation of a first transverse airflow passage 290 including a longitudinal first transverse passage axis 296 is shown. One or more fin or rib portions 292 extend into first transverse airflow passage 290 and longitudinally along first transverse airflow passage 290 at a fin or rib angle 294 with respect to first transverse passage axis 296 of first transverse airflow passage 290. In an exemplary embodiment, fin or rib angle 294 is in the range zero to ten degrees, but may be in the range zero to thirty degrees. The benefit of the configuration shown is that if airflow having no swirl encounters fin or rib portions 292, swirl is introduced into the airflow. Depending on the direction of the angles of fin or rib portions 292, the introduction of swirl may be either clockwise or counterclockwise. Such an introduction of swirl may be beneficial when entering combustion chamber 66. Fin or rib portions 292 may be inserted from an end of first transverse airflow passage 290, may be cast into first transverse airflow passage 290, or may be attached to an interior wall forming first transverse airflow passage 290.

While the embodiments of FIGS. 12, 13, and 14 describe fin or rib angles as being in the range zero up to thirty degrees, more broadly, the fin or rib angles of the various fin or rib portions described herein may be adjusted to vary the amount of swirl in combustion chamber 66. A zero degree fin or rib angle, which corresponds to a fin or rib portion extending along the axis of an airflow passage, yields little or no swirl in the airflow that enters combustion chamber 66. Increasing the angle of a fin or rib portion with respect to the longitudinal axis increases swirl or reduces swirl, depending on the direction of the fin or rib angle. Furthermore, because a fin or rib portion may be angled in either direction, i.e., either clockwise or counterclockwise when viewing a fin or rib portion long its length, then the fin or rib angle of a fin or rib portion may be in the range −30 degrees to +30 degrees, depending on the desired effect on airflow. While the angles shown are generally flat or fixed angles, the various fin and rib configurations may also be formed in a spiral, helical, or corkscrew type shape, as long as the angle ranges are observed and the dimensions of the fin and rib configuration meet the dimensional requirements described hereinbelow.

Referring to FIG. 15, an eighth exemplary embodiment of the present disclosure is shown. The description of this embodiment is limited to the first transverse airflow passage for simplicity. An intake manifold portion 300 includes a first passage interior surface 308 that forms a first transverse airflow passage 304 including a first transverse passage axis 306 and a fin or rib portion 302 extending from one side of first transverse airflow passage 304 to an opposite side of first transverse airflow passage 304. Fin or rib portion 302 may positioned within first transverse airflow passage 304 as described hereinabove, using a forming technique such as casting, inserted into one or more grooves, or held and attached using a process such as welding. The primary advantage to fin or rib portion 302 may be in the ease of installing fin or rib portion 302.

Referring to FIG. 16, a ninth exemplary embodiment of the present disclosure is shown. The description of this embodiment is limited to the first transverse airflow passage for simplicity. An intake manifold portion 320 includes a first transverse airflow passage 324 and a fin or rib portion 322 that includes a plurality of wall portions 326 that extend from intake manifold portion 320. Fin or rib portion 322 may be positioned or formed within first transverse airflow passage 324 as previously described. While four wall portions 326 are shown, any number of wall portions 326 may be included as long as wall portions 326 do not provide an excessive pressure drop to airflow passing across fin or rib portion 322.

Referring to FIG. 17, a tenth exemplary embodiment of the present disclosure is shown. A spacer portion 330 includes a planar surface 342, a first spacer passage 332 that extends longitudinally away from planar surface 342 into spacer portion 330, and a second spacer passage 332 that extends longitudinally away from planar surface 342 into spacer portion 330. Spacer portion 330 is sized and configured to be positioned between intake manifold portion 26a or 26b and combustion chamber 66. The position of first spacer passage 332 and second spacer passage 334 is such that when intake manifold portion 26a or 26b is attached to cylinder head 16, intake air is able to flow from first transverse airflow passage 48 into and through first spacer passage 332, then into first head passage 68 of cylinder head 16, and then into combustion chamber 66. Intake air is similarly able to flow from second transverse airflow passage 50 into and through second spacer passage 334, then into second head passage 70 of cylinder head 16, and then into combustion chamber 66. Spacer portion 330 also includes a plurality of fin or rib portions 336 that are positioned at least partially within first spacer passage 332 and second spacer passage 334 and may include an interface portion 338 the mates with a slot or groove 340 to secure fin or rib portions 336 to prevent movement of fin or rib portions 336. Fin or rib portions 336 extend longitudinally away from planar surface 342 of spacer portion 330, and may extend perpendicularly to planar surface 342. When spacer portion 330 is attached to intake manifold portion 26a or intake manifold portion 26b, fin or rib portions 336 extend into and longitudinally along first transverse airflow passage 48 and second transverse airflow passage 50. The advantage of the tenth embodiment is that it permits the use of all current engine components while achieving the benefits of the present disclosure described hereinabove. Furthermore, installation of the fin or rib portions is greatly simplified since they are securely attached to spacer portion 330 prior to insertion into first transverse airflow passage 48 and second transverse airflow passage 50. However, spacer portion 330 may only be used in applications that permit moving intake manifolds 22 further from engine body plane 32.

To provide for optimum effectiveness, the fin or rib portions of the various embodiments described herein may be associated with certain dimensional ranges. Referring to FIGS. 18 and 19, a portion of an intake manifold portion 352 including an interior wall 354 that forms a longitudinal first transverse airflow passage 346, including a first transverse passage axis 350 and having a bore diameter B, is shown to illustrate exemplary dimensions suitable for use with the embodiments described hereinabove. One or more fin or rib portions 348 having a thickness T extend from interior wall 354 into airflow passage 346 a distance or width P and along airflow passage 346 a length L. Fin or rib portions 348 illustrate exemplary dimensions suitable for use with the embodiments described hereinabove. Dimensions P, T, L, and B operate best when meeting the requirements of equations (1), (2), and (3).

$$0.10 \leq \frac{P}{B} \leq 0.40 \qquad \text{Equation (1)}$$

$$0.10 \leq \frac{T}{P} \leq 0.40 \qquad \text{Equation (2)}$$

$$0.60 \leq \frac{L}{B} \leq 3.00 \qquad \text{Equation (3)}$$

In an exemplary embodiment, the ratio of equation (1) is at an optimal value at 0.25, the ratio of equation (2) is at an optimal value at 0.25, and the ratio of equation (3) is at an optimal value at 1.0. As previously noted, another aspect of the present disclosure is the need to minimize pressure drop. Thus, the thinnest fin or rib portion possible is desirable while maintaining the strength and ability to form the fin or rib portion through the appropriate manufacturing process. In an exemplary embodiment, the fin or rib portions described hereinabove are configured in accordance with equation (4).

$$0.02 \leq \frac{T}{B} \leq 0.20 \qquad \text{Equation (4)}$$

Figure 21:
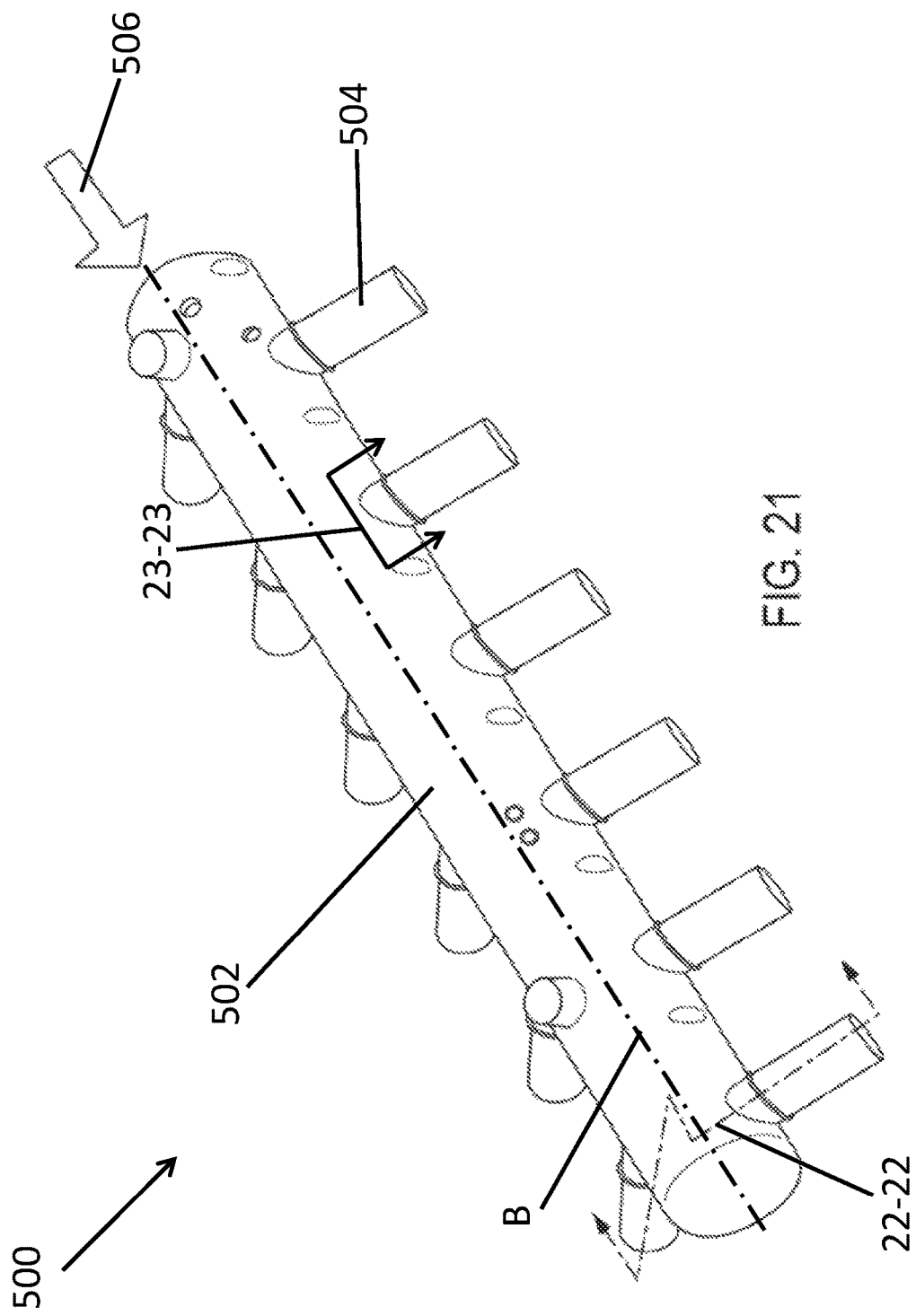
FIG. 21 is a perspective view of an intake manifold portion of an internal combustion engine.
Figure 22:
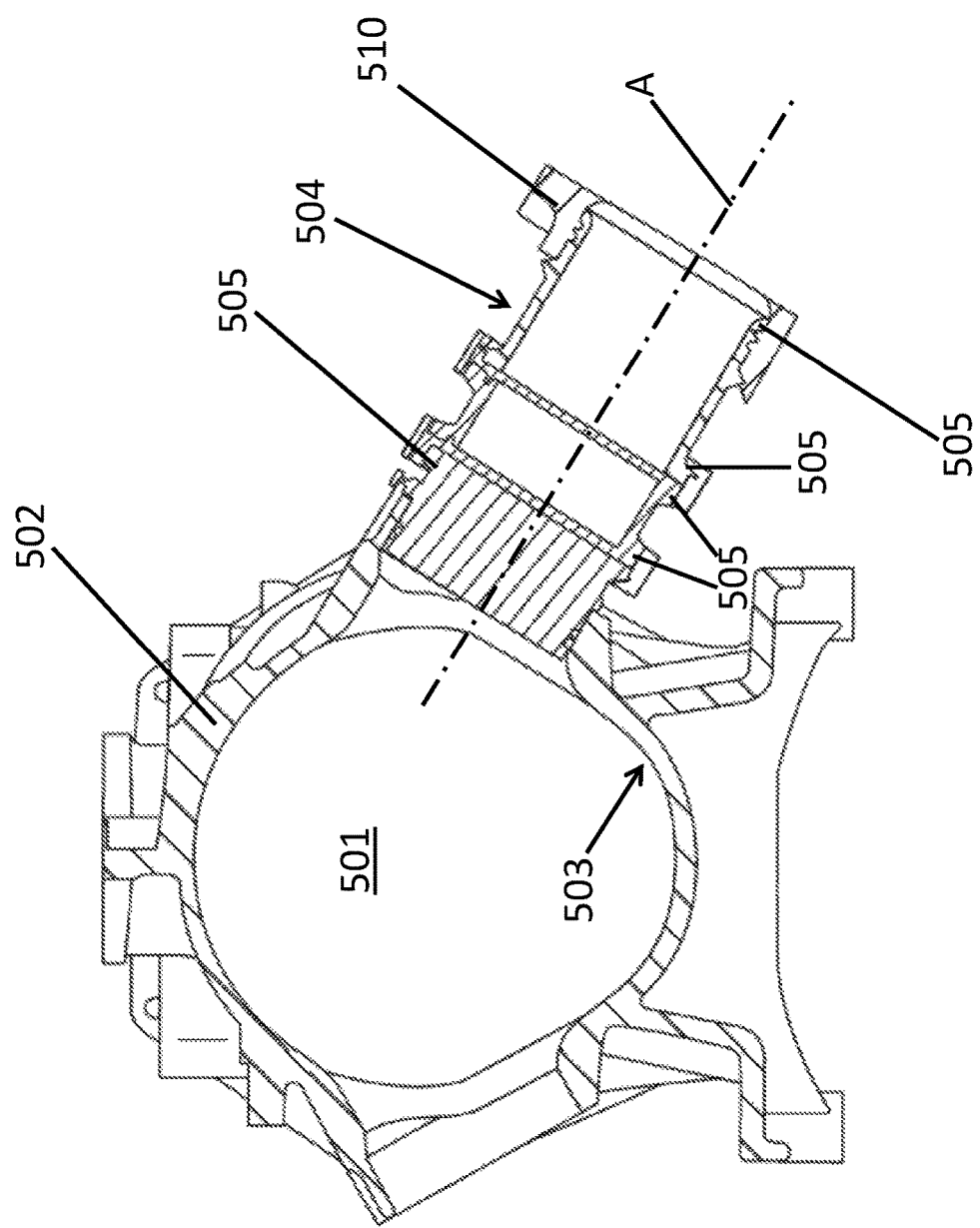
FIG. 22 is a cross-sectional elevational view of a portion of the intake manifold portion of FIG. 21 along the lines 22-22.

Referring now to FIGS. 21-24, an intake manifold portion 500 is shown. Intake manifold portion 500 as discussed herein is applicable to diesel engines, spark ignition engines, and dual fuel engines among other engine applications. Intake manifold portion 500 includes intake log 502 having a plurality of jumper tubes or intake runners 504 coupled to intake log 502. Intake log 502 defines a passageway 501 (FIG. 22) that is in fluid communication with passageway 520 of jumper tube 504. Further, as shown in FIGS. 21-24, intake manifold 500 has an axis B. With respect to jumper tube 504 discussed further below and as shown in FIG. 21, intake manifold portion 500 is positioned on the inside of the V-configuration that is formed by the cylinder heads (not shown) that are coupled to jumper tube 504 at attachment point 510 (location as indicated in FIG. 22).

Jumper tubes 504 are also coupled to cylinder heads at attachment point 510 (FIG. 22), which include intake ports (not shown) leading to engine cylinders (not shown). Jumper tubes 504 serve as intermediate conduits through which intake charge (e.g., air) can flow thereby moving from intake log 502 to engine cylinder (not shown). In an alternate embodiment, jumper tubes 504 are integrally formed with intake log 502 and/or cylinder head (not shown). In one embodiment, jumper tubes 504 have a substantially circular cross sectional area.

In one embodiment, jumper tubes 504 are made of a single material. As shown in at least FIG. 22, jumper tubes 504 include a plurality of ridges 505 positioned along the outer periphery of jumper tubes 504. In one embodiment, ridges 505 are positioned along the outer periphery at both ends of jumper tubes 504 such that ridges 505 are mechanically coupled to intake log 502 and cylinder head (not shown, at attachment point 510) thereby engaging jumper tube 504 with intake log 502 and cylinder head (not shown). In an alternate embodiment, other coupling means are used to couple jumper tube 504 with cylinder head (not shown) and intake log 502 such as couplers, fasteners, etc.

Figure 23:
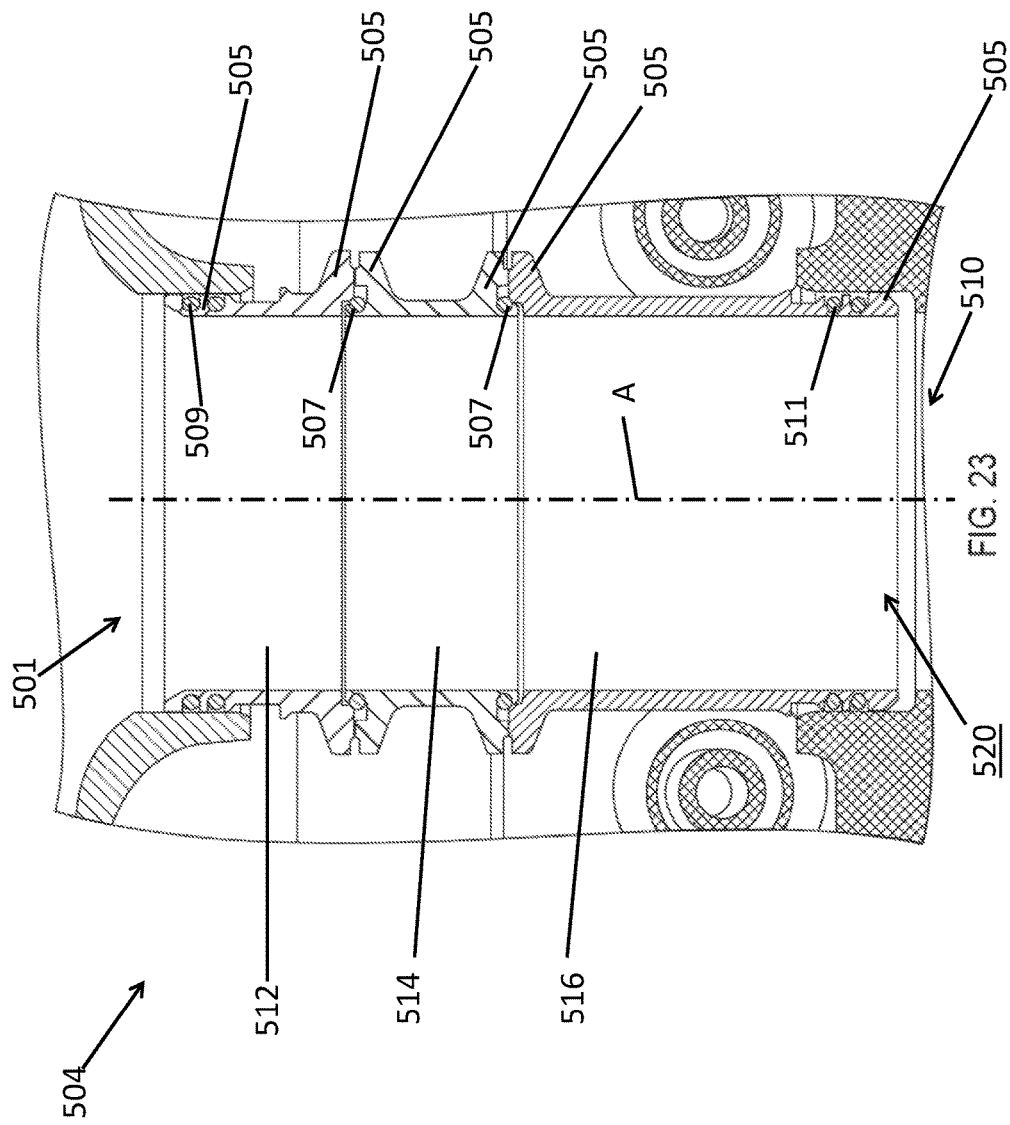
FIG. 23 is a sectional top view of a jumper tube of the intake manifold portion of FIG. 21 along the lines 23-23.

In an alternate embodiment, jumper tubes 504 include multiple portions that are coupled together to form jumper tubes 504. As shown in FIG. 23, jumper tube 504 includes first portion 512, second portion 514, and third portion 516. First portion 512 and second portion 514 are positioned adjacent to each another, and second portion 514 and third portion 516 are positioned adjacent to each other. First portion 512 is coupled to second portion 514 by a clamp 546, and second portion 514 is coupled to third portion 516 by a second clamp 548 as shown in FIG. 24 and described further below. However, it is contemplated that in alternate embodiments, other suitable means for coupling second portion 514 to first portion 512, third portion 516, or both may be used such as couplers, fasteners, clips, nails, pins, etc. Clamps 546, 548 allow for portions of jumper tube 504 to be removed without first removing either cylinder head from attachment point 510 or intake manifold 500. The segmented jumper tube 504 also allows for the removal of cylinder head (not shown) without removing intake manifold 500. Furthermore, the segmented jumper tube 504 allows for easier access to fins 518, 526, 532, and 544 as discussed herein for any maintenance or adjustment of the fins that may be needed in order to manage the uniformity of the flow of intake charge.

Furthermore, first portion 512, second portion 514, and third portion 516 are coupled to each other by O-rings 507 as shown in FIG. 23 to provide a seal between the portions 512, 514, and 516. O-rings 509, 511 as shown in FIG. 23 couple first portion 512 to intake log 501 of intake manifold 500 and third portion 516 to a cylinder head (not shown) at attachment point 510, respectively, in order to provide seals between the portions and the intake log 501 of intake manifold 500 and cylinder head (not shown) at attachment point 510.

Each portion has ridges 505 that are positioned along the outer periphery at both ends of each portion. Ridges 505 of each portion are aligned and positioned adjacent to each other such that clamps 546, 548 (FIG. 24) can latch onto the ridges of the adjacent portions thereby coupling first portion 512, second portion 514, and third portion 516 to each other and maintaining the aligned of the portions relative to each other.

As shown in FIG. 23, first portion 512 is coupled to intake log 502, and third portion 516 is coupled to cylinder head (not shown) at attachment point 510. In one embodiment, ridges 505 of first portion 512 and ridges 505 of third portion 516 mechanically couple to a portion of intake log 502 and cylinder head (not shown) at attachment point 510, respectively, such that movement of first portion 512, third portion 516, and jumper tube 504 is limited during operation. In an alternate embodiment, other types of visual alignment marks and/or physical indexing arrangements may be optionally employed along jumper tubes 504.

Referring to FIG. 24, fin 518 is shown coupled to intake log 502 within passageway 501. In an alternate embodiment, fin 518 is integrally formed with or cast within intake log 502. Fin 518 is positioned at the interface of intake log 502 and jumper tube 504 such that the surface of fin 518 is substantially perpendicular to the flow direction of intake charge (i.e., along arrow 506 as shown in FIG. 21). In other words, fin 518 forms a plane that that is substantially perpendicular to axis B of intake manifold 500. In an exemplary embodiment, the plane formed by fin 518 is substantially parallel with axis A of jumper tube 504. However, in an alternate embodiment, the plane formed by fin 518 is not parallel with axis A of jumper tube 504.

It is also contemplated that in alternate embodiments, the positioning of fin 518 may vary within a span of about 20 degrees in either direction from the perpendicular orientation with respect to the flow direction of intake charge. In a further embodiment, fin 518 is made of a castable stainless steel. However, it is contemplated that in alternate embodiments, other suitable materials for fin 518 may be used, such as aluminum, iron, steel, and composite materials. Fin 518 may have a thickness of at least 1 mm. In a further exemplary embodiment, fin 518 has a thickness between 1 mm and 10 mm. In a further exemplary embodiment, fin 518 may have a tapered thickness in which fin 518 may be thicker at the base as compared to the end of fin 518 where it may be thinner (less thick).

Referring now to FIGS. 25A-D and 26A-B, various embodiments of jumper tube 504 are shown. As shown in FIGS. 26A-B, jumper tube 504 is configured to receive a fin 519 such that fin 519 enters a portion of passageway 520 of jumper tube 504 and engages with jumper tube 504 such that further axial movement along the central axis A of jumper tube 504 is limited.

Fin 519 is inserted into passageway 520 of jumper tube 504 at a depth such that a portion of fin 519 protrudes outwardly from jumper tube 504 as shown in FIG. 26B. When jumper tube 504 and fin 519 are coupled to intake log 502, a portion of fin 519 extends from passageway 520 into passageway 501 of intake log 502. By extending into passageway 501 of intake log 502, fin 518 is able to assist in straightening the flow of intake charge which provides advantages for the engine cylinders (not shown) as discussed further below.

In FIGS. 25A-D, alternate configurations of jumper tube 504 are shown with various arrangements of fin portions and rib portions. In one embodiment, jumper tube 504 includes a fin portion that is integrally formed with jumper tube 504, i.e., the jumper tube 504 is a single piece that includes the fin portion 526. In an alternate embodiment, jumper tube 504 includes a rib portion that is integrally formed with jumper tube 504. In a further alternate embodiment, jumper tube 504 includes a combination of a rib portion and a fin portion that is integrally formed with jumper tube 504. In a further alternate embodiment, exemplary rib portions and fin portions are coupled to jumper tube 504.

Figure 25B:
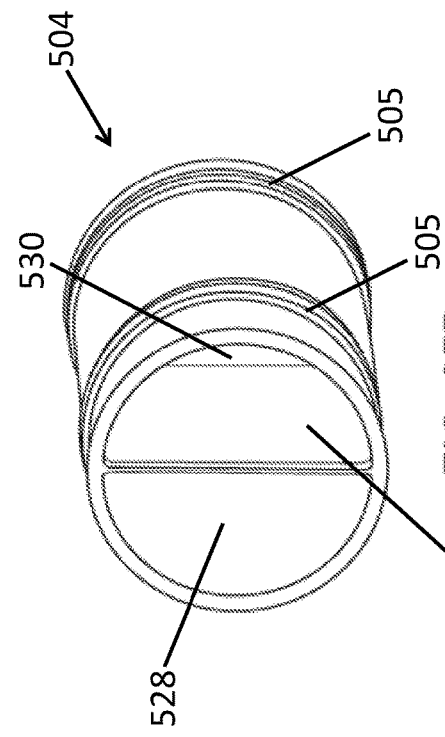
FIG. 25B is a perspective view of an alternate embodiment of the jumper tube of the intake manifold portion of FIG. 21 in accordance with the present disclosure.
Figure 25D:
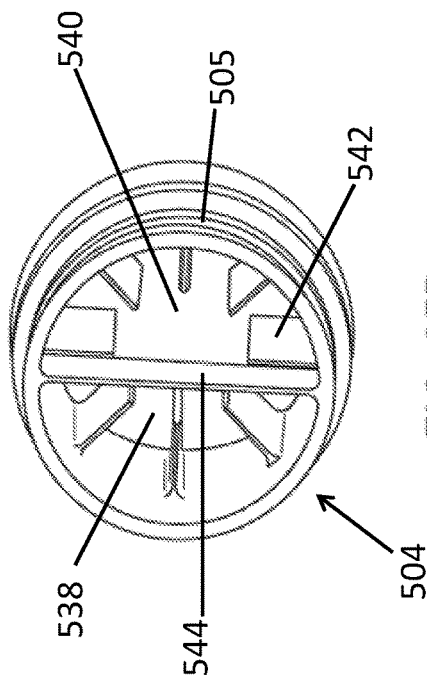
FIG. 25D is a perspective view of an alternate embodiment of the jumper tube of the intake manifold portion of FIG. 21 in accordance with the present disclosure.
Figure 25A:
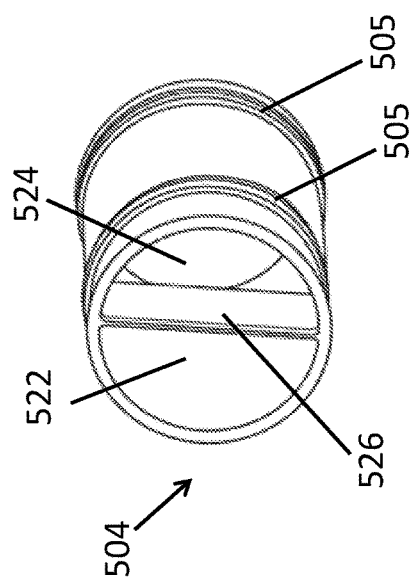
FIG. 25A is a perspective view of an embodiment of the jumper tube of the intake manifold portion of FIG. 21 in accordance with the present disclosure.

As shown in FIG. 25A, fin portion 526 is shown to span the diameter of jumper tube 504 to define a first transverse airflow passage 522 and a second transverse airflow passage 524. In the illustrated embodiment, the areas of first transverse airflow passage 522 and second transverse airflow passage 524 are substantially equal. In an alternate embodiment, fin portion 526 traverses the distance between two different points along the inner surface of the rim of jumper tube 504 while not intersecting central axis A (FIG. 26) to define two transverse airflow passages where the areas of the two transverse airflow passages are not equal. Fin portion 526 axially extends along central axis A (FIG. 26A) of jumper tube 504 to a depth within jumper tube 504 such that fin portion 526 substantially spans the length of first portion 512 as defined along central axis A (FIG. 26A). In one embodiment, fin portion 526 is integrally formed within the first portion 512 of jumper tube 504. In a further alternate embodiment, fin portion 526 axially extends along central axis A (FIG. 26A) of jumper tube 504 to a depth within jumper tube 504 such that fin portion 526 substantially spans the full length L (FIG. 26A) of jumper tube 504 as defined along central axis A (FIG. 26A). It is further contemplated that in alternate embodiments, fin portion 526 may be positioned at varying depths or within different portions of jumper tube 504 (e.g., some fin portions 526 may be positioned within second portion 514, other fin portions 526 may be positioned within third portion 516, etc.).

In FIG. 25B, fin portion 532 spans the diameter of jumper tube 504 (intersecting central axis A (FIG. 26A)) to define a first transverse airflow passage 528 and a second transverse airflow passage 530. In the illustrated embodiment, the areas of first transverse airflow passage 528 and second transverse airflow passage 530 are substantially equal. In an alternate embodiment, fin portion 532 traverses the distance between two different points along the inner surface of the rim of jumper tube 504 while not intersecting central axis A (FIG. 26A) to define two transverse airflow passages where the areas of the two transverse airflow passages are not equal. Fin portion 532 axially extends along central axis A (FIG. 26A) of jumper tube 504 to a depth within jumper tube 504 such that fin portion 532 substantially spans the length of first portion 512 and a portion of second portion 514 defined along central axis A (FIG. 26A). In an alternate embodiment, fin portion 532 axially extends along central axis A (FIG. 26A) of jumper tube 504 to a depth within jumper tube 504 such that fin portion 526 substantially spans the full length L (FIG. 26A) of jumper tube 504 as defined along central axis A (FIG. 26A). It is further contemplated that in alternate embodiments, fin portion 532 may be positioned at varying depths or within different portions of jumper tube 504 (e.g., some fin portions 532 may be positioned within second portion 514, other fin portions 532 may be positioned within third portion 516, etc.).

Figure 25C:
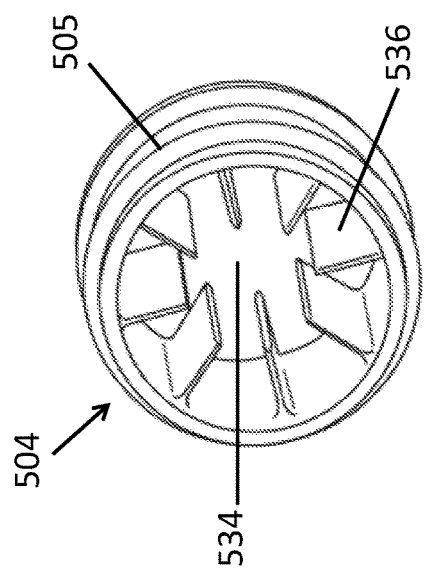
FIG. 25C is a perspective view of a further alternate embodiment of the jumper tube of the intake manifold portion of FIG. 21 in accordance with the present disclosure.

Jumper tube 504 may also include a plurality of rib portions 536 positioned radially along the interior of jumper tube 504 to define a transverse airflow passage 534 as shown in FIG. 25C. The plurality of rib portions 536 are integrally formed with the inner surface of jumper tube 504 and extend inwards such that transverse airflow passage 534 is not uniform. In one embodiment, rib portions 536 partially extend inwardly within jumper tube 504, and each rib portion 536 is of equal length. However, it is contemplated that in alternate embodiments, rib portions 536 have different lengths. In an alternate embodiment, rib portions 536 are positioned radially along the inner surface of jumper tube 504 in a substantially uniform pattern. However, it is contemplated that in alternate embodiments, rib portions 536 may be positioned at varying depths within jumper tube 504 (e.g., some rib portions 536 may be within first portion 512, others within second portion 514 and third portion 516). It is also contemplated that, in alternate embodiments, rib portions 536 are unevenly spaced (non-uniform pattern) with respect to each other. For example, there may be 30 degrees of separation between a first rib portion 536 and a second rib portion 536 along the inner surface of jumper tube 504 and 90 degrees of separation between the second rib portion 536 and the third rib portion 536 along the inner surface of jumper tube 504. In a further alternate embodiment, jumper tube 504 includes at least one rib portion 536 along the inner surface of jumper tube 504.

Referring now to FIG. 25D, an alternate embodiment of jumper tube 504 is shown. Jumper tube 504 includes a plurality of rib portions 542 and a fin portion 544 integrally formed with the inner surface of jumper tube 504. Fin portion 544 spans the diameter of jumper tube 504 to define a first transverse airflow passage 538 and a second transverse airflow passage 540. In the illustrated embodiment, the areas of first transverse airflow passage 538 and second transverse airflow passage 540 are substantially equal. In an alternate embodiment, fin portion 544 traverses the distance between two different points along the inner surface of the rim of jumper tube 504 while not intersecting central axis A (FIG. 26A) to define two transverse airflow passages where the areas of the two transverse airflow passages are not equal. Fin portion 544 axially extends along central axis A (FIG. 26A) of jumper tube 504 to a depth within jumper tube 504 such that fin portion 544 substantially spans the length of first portion 512 defined along central axis A (FIG. 26A). In an alternate embodiment, fin portion 544 axially extends along central axis A (FIG. 26A) of jumper tube 504 to a depth within jumper tube 504 such that fin portion 544 substantially spans the full length L (FIG. 26A) of jumper tube 504 as defined along central axis A (FIG. 26A). It is further contemplated that in alternate embodiments, fin portion 544 may be positioned at varying depths or within different portions of jumper tube 504 (e.g., some fin portions 544 may be positioned within second portion 514, other fin portions 544 may be positioned within third portion 516, etc.).

In alternate embodiments, fin portions 526, 532, and 544 of FIGS. 25A, C, and D, respectively, do not have a substantially uniform shape. In a further alternate embodiment, fins 526, 532, and 544 have varying thicknesses throughout the fin. For example, fins 526, 532, and 544 may have a tapered profile in which the fins may be thicker at the base of the fin as compared to the end of the fin where it may be thinner (less thick).

Rib portions 542 are positioned radially along the interior surface of jumper tube 504. The plurality of rib portions 542 are integrally formed with the inner surface of jumper tube 504 and extend inwards such that transverse airflow passages 538, 540 are not uniform. As shown in FIG. 25D, rib portions 542 are positioned at a different depth within jumper tube 504 than fin portion 544. Fin portion 544 is shown to span the length of first portion 512 along central axis A (FIG. 26), and rib portions are positioned within second portion 514. However, it is contemplated that fin portion 544 and rib portions 542 may be positioned at varying depths or within different portions of jumper tube 506 in alternate embodiments (e.g., fin portion 544 may be positioned within second portion 514 and rib portions 542 may be positioned within third portion 516, etc.).

In one embodiment, rib portions 542 partially extend inwardly within jumper tube 504, and each rib portion 542 is of equal length. However, it is contemplated that in alternate embodiments, rib portions 542 have different lengths. In an alternate embodiment, rib portions 542 are positioned radially along the inner surface of jumper tube 504 in a substantially uniform pattern. However, it is contemplated that in alternate embodiments, rib portions 542 may be positioned at varying depths within jumper tube 504 (e.g., some rib portions 542 be within second portion 514 and others within third portion 516). It is also contemplated that, in alternate embodiments, rib portions 536 are unevenly spaced (non-uniform pattern) with respect to each other. For example, there may be 30 degrees of separation between a first rib portion 542 and a second rib portion 542 along the inner surface of jumper tube 504 and 90 degrees of separation between the second rib portion 542 and the third rib portion 542 along the inner surface of jumper tube 504. In a further alternate embodiment, jumper tube 504 includes at least one rib portion 542 along the inner surface of jumper tube 504.

Similar to the configurations of FIGS. 26A, B, fin portions 526, 532, and 544 may protrude from jumper tube 504 into intake manifold 501.

Configurations of jumper tube 504 shown in FIGS. 25 and 26 serve to reduce the rotational motion by straightening the flow of intake charge within jumper tube 504 and to create a more uniform velocity distribution of the intake charge that is within jumper tube 504 and that exits jumper tube 504. Reducing the rotational motion and creating a more uniform velocity distribution of the intake charge benefits the engine as discussed further below.

In relation to fin 518 of FIG. 24, configurations of jumper tube 504 shown in FIGS. 25A-D may abut fin 518 when jumper tube 504 is installed onto intake log 502. The abutment of fin 518 with a jumper tube 504 configuration serves to extend the flow straightener function of jumper tubes 504 into intake manifold 501 thereby beginning to straighten the flow of intake charge before it enters jumper tube 504. However, it is contemplated that in alternate embodiments, fin portions 526, 532, and 544 of FIGS. 25A-D may be used when intake manifold 501 does not include fin 518.

In an alternate embodiment, the configurations of FIGS. 25A-D and 26A-B can be positioned in a different segment of jumper tube 504 (e.g., within third portion 516 of jumper tube 504). In a further alternate embodiment, fin portions or rib portions may be positioned in a segment of an elbow (not shown) or an intake port (not shown) of the cylinder head. In yet another alternate embodiment, fin portions or rib portions may be arranged in an alternate configuration within jumper tube 504, such as a honeycomb pattern.

During operation, intake charge (e.g., air) enters intake manifold portion 500 and moves through passageway 501 of intake log 502 in the indicated direction of arrow 506. The charge enters intake log 502 and then turns into one of jumper tubes 504 and continues to flow through jumper tubes 504 and into cylinder heads (not shown). As the charge turns from intake log 502 to jumper tube 504, rotational motion and/or non-uniformity within the charge flow may be introduced from bend 503 (FIG. 22) as the charge flow may not be able to follow bend 503 with a relatively sharp inside bend radius. Fins 518, 526, 532, and 544 and rib portions 536 and 542 help straighten the charge after bend 503 by reducing the amount of rotational motion of the charge. Exemplary fins or ribs positioned with intake manifold 501 and/or jumper tube 504 reduce variations in swirl and air motion (in the form of tumble) leading to a more uniform intake charge among engine cylinder heads (not shown). In an exemplary embodiment, exemplary fins reduce bank to bank swirl variation from approximately 15% of nominal swirl with no fin or rib portions to 7% or less using a vertical fin in a jumper tube 504.

A more uniform intake charge provides more consistent contributions to in-cylinder air motion, more consistent power output and more uniform combustion events from each combustion chamber or cylinder, and greater control for combustion performance of the engine. A more uniform intake charge also provides for decreased emissions (e.g., decreased particulate emissions (also described as smoke), hydrocarbon emissions, and NOx emissions), a greater knock margin, improved fuel economy, wider rich and lean limits, etc. Additionally, more consistent combustion between cylinders improves the efficiency, emissions, and the mechanical integrity of the engine by eliminating excessively high cylinder pressures in some cylinders, which could result if the combustion is much faster than in other cylinders.

While various embodiments of the disclosure have been shown and described, it is understood that these embodiments are not limited thereto. The embodiments may be changed, modified and further applied by those skilled in the art. Therefore, these embodiments are not limited to the detail shown and described previously, but also include all such changes and modifications.

We claim:

1. An internal combustion engine, comprising: an intake manifold; a plurality of jumper tubes coupled to the intake manifold and at least one cylinder head, the plurality of jumper tubes each having a passageway, and a central axis; wherein at least one of the plurality of jumper tubes further includes a fin portion and a rib portion, wherein the fin portion traverses a distance between two points along the interior surface of the jumper tube to define a first transverse airflow passage and a second transverse airflow passage, wherein the fin is positioned at or near an interface where the jumper tube and the intake manifold are coupled, and wherein the rib portion comprises a plurality of ribs extending radially inward from the interior surface of the jumper tube toward the central axis.

2. The internal combustion engine of claim 1, wherein at least one of the plurality of jumper tubes each further comprise a first portion and a second portion coupled to each other to define the passageway, wherein the first portion is coupled to the intake manifold and the second portion is coupled to the at least one cylinder head.

3. The internal combustion engine of claim 2, wherein the first portion and the second portion are coupled to each other by an O-ring to provide a seal between the first portion and the second portion.

4. The internal combustion engine of claim 2, wherein the fin portion is positioned in the first portion of the jumper tube.

5. The internal combustion engine of claim 1, wherein the fin portion is integrally formed with the jumper tube.

6. The internal combustion engine of claim 1, wherein the plurality of ribs are positioned in the first portion of the jumper tube.

7. The internal combustion engine of claim 1, wherein the fin portion is positioned in the first portion and the plurality of ribs is positioned in the second portion of the jumper tube, wherein the first portion of the jumper tube and the second portion of the jumper tube are coupled to each other.

8. An internal combustion engine, comprising: an intake manifold; a plurality of jumper tubes coupled to the intake manifold and at least one cylinder head, the plurality of jumper tubes each having a passageway, and a central axis; the plurality of jumper tubes including a first portion coupled to the intake manifold, a third portion coupled to the at least one cylinder head, and a second portion removably coupled to the first portion and the second portion such that the second portion of the jumper tube can be removed without removing the intake manifold or the least one cylinder head; wherein at least one of the plurality of jumper tubes further includes a fin portion and a rib portion, the fin portion and the rib portion positioned within the first portion, the fin portion and the rib portion extending inwardly from the interior surface of the jumper tube within the passageway; wherein the fin portion traverses a distance between two points along the interior surface of the jumper tube to define a first transverse airflow passage and a second transverse airflow passage.

9. The internal combustion engine of claim 8, wherein the at least one cylinder head includes a first cylinder head and a second cylinder head configured to form a V-configuration, and the intake manifold is positioned within the V-configuration.

10. The internal combustion engine of claim 8, wherein the rib portion includes a plurality of ribs extending radially inward from the interior surface of the jumper tube toward the central axis.

11. An internal combustion engine, comprising: an intake manifold; a plurality of jumper tubes coupled to the intake manifold and at least one cylinder head, the plurality of jumper tubes each having a passageway, and a central axis; wherein at least one of the plurality of jumper tubes further includes a fin portion and a rib portion, wherein the fin portion traverses a distance between two points along the interior surface of the jumper tube to define a first transverse airflow passage and a second transverse airflow passage, wherein the fin portion is configured to assist in straightening the flow of intake charge, and wherein the rib portion comprises a plurality of ribs extending radially inward from the interior surface of the jumper tube toward the central axis.

12. The internal combustion engine of claim 11, wherein at least one of the plurality of jumper tubes each further comprise a first portion and a second portion coupled to each other to define the passageway, wherein the first portion is coupled to the intake manifold and the second portion is coupled to the at least one cylinder head.

13. The internal combustion engine of claim 12, wherein the first portion and the second portion are coupled to each other by an O-ring to provide a seal between the first portion and the second portion.

14. The internal combustion engine of claim 12, wherein the fin portion is positioned in the first portion of the jumper tube.

15. The internal combustion engine of claim 11, wherein the fin portion is integrally formed with the jumper tube.

16. The internal combustion engine of claim 11, wherein the plurality of ribs are positioned in the first portion of the jumper tube.

17. The internal combustion engine of claim 12, wherein the fin portion is positioned in the first portion and the plurality of ribs is positioned in the second portion of the jumper tube, wherein the first portion of the jumper tube and the second portion of the jumper tube are coupled to each other.

* * * * *